United States Patent [19]
Zou et al.

[11] Patent Number: 5,997,977
[45] Date of Patent: Dec. 7, 1999

[54] INFORMATION RECORDING SUBSTRATE AND INFORMATION RECORDING MEDIUM PREPARED FROM THE SUBSTRATE

[75] Inventors: Xuelu Zou; Kazuaki Hashimoto, both of Akishima, Japan

[73] Assignee: Hoya Corporation, Tokyo, Japan

[21] Appl. No.: 09/090,157

[22] Filed: Jun. 4, 1998

Related U.S. Application Data

[60] Provisional application No. 60/066,675, Nov. 14, 1997, and provisional application No. 60/048,623, Jun. 5, 1997.

[51] Int. Cl.$^6$ ........................................................... B32B 3/00
[52] U.S. Cl. .................... 428/64.1; 428/64.2; 428/64.4; 428/65.3; 428/426; 428/694 ST; 428/702; 428/913
[58] Field of Search .................................. 428/64.1, 64.2, 428/64.3, 64.4, 65.3, 426, 694 ST, 702, 913

[56] References Cited

U.S. PATENT DOCUMENTS

| | | | |
|---|---|---|---|
| 5,834,106 | 11/1998 | Kamiaka et al. | 428/304.4 |
| 5,846,628 | 12/1998 | Kuroe et al. | 428/65.3 |
| 5,872,069 | 2/1999 | Abe | 501/5 |
| 5,874,376 | 2/1999 | Taguchi et al. | 501/63 |
| 5,895,768 | 4/1999 | Speit | 501/57 |
| 5,900,296 | 5/1999 | Hayashi et al. | 428/64.1 |
| 5,902,665 | 5/1999 | Kuroda | 428/141 |

FOREIGN PATENT DOCUMENTS

| | | |
|---|---|---|
| 1-201043 | 8/1989 | Japan . |
| 10-1327 | 1/1998 | Japan . |
| 10-1329 | 1/1998 | Japan . |
| 10-15128 | 1/1998 | Japan . |
| 10-79122 | 3/1998 | Japan . |
| 10-81540 | 3/1998 | Japan . |
| 10-81542 | 3/1998 | Japan . |

*Primary Examiner*—Elizabeth Evans
*Attorney, Agent, or Firm*—Sughrue, Mion, Zinn, Macpeak & Seas, PLLC

[57] ABSTRACT

A substrate for an information recording medium is prepared from a glass substance having a Young's modulus not smaller than 100 GPa and a liquidus temperature not higher than 1350° C.

59 Claims, 1 Drawing Sheet

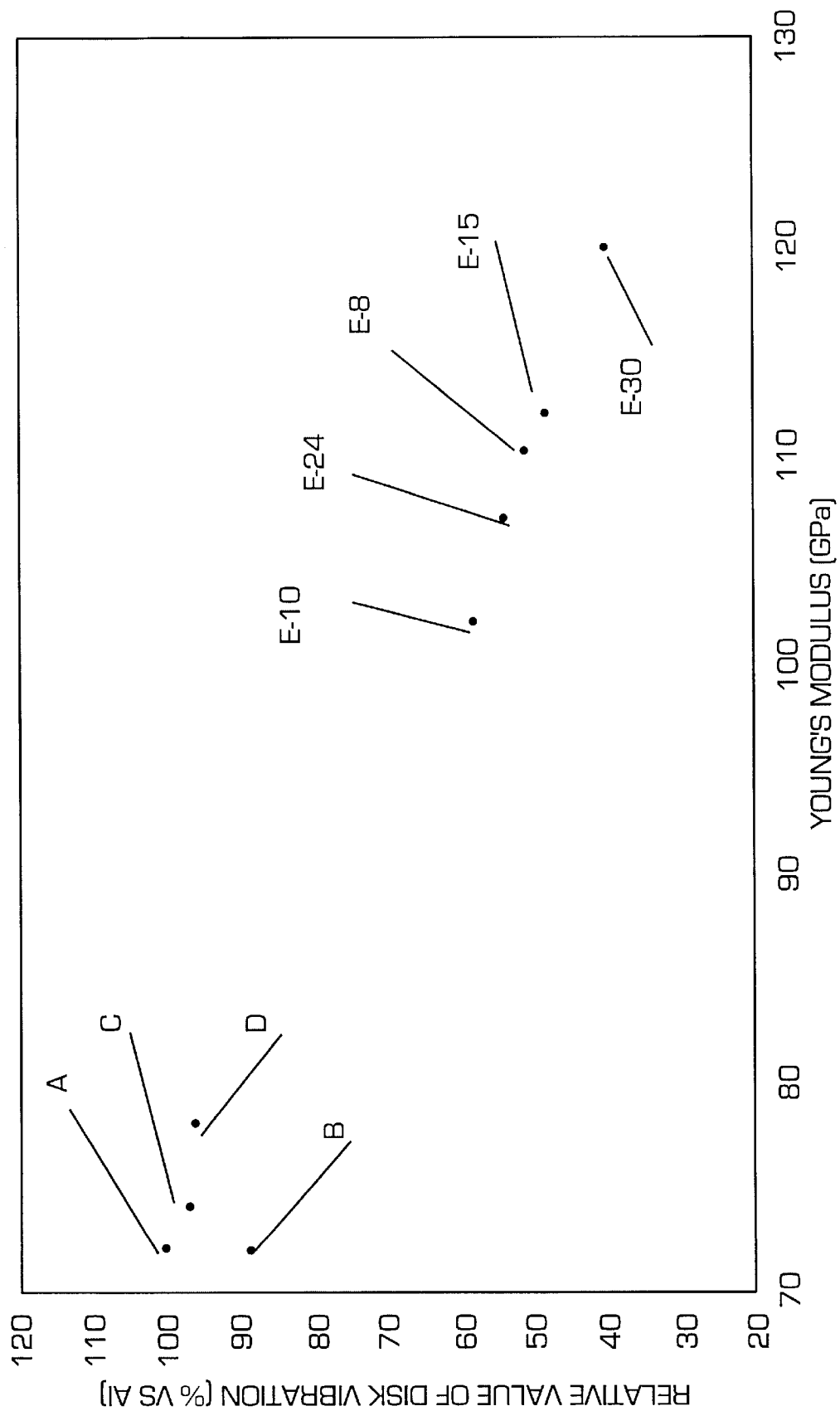

INFORMATION RECORDING SUBSTRATE AND INFORMATION RECORDING MEDIUM PREPARED FROM THE SUBSTRATE

This application claims the benefit of provisional application 60/066,675, filed Nov. 14, 1997 and provisional application 60/048,623, filed Jun. 5, 1997.

BACKGROUND OF THE INVENTION

This invention relates to a disk substrate (may simply be referred to as a substrate hereinafter) for use in an information recording medium, such as a magnetic disk, an optical disk, and a magnetooptic disk and, in particular, to a glass substrate for an information recording medium as well as an information recording medium using the glass substrate.

As a substrate for an information recording medium, use is generally made of an aluminum substrate, an amorphous glass substrate (simply referred to as a glass substrate hereinafter), and a crystallized glass substrate. Among others, the glass substrate is gradually expanding its market share. This is because the glass substrate is easy to obtain desirable surface smoothness (i.e., a small surface roughness Rmax) and has strength sufficient to withstand a reduction in thickness and size, as compared with the other substrates.

Among various glass substrates, a chemically strengthened glass substrate with its surface chemically strengthened by ion exchange is widely known in the art. A typical chemically strengthened glass substrate is disclosed in Japanese Patent Publication (JP-B) No. 70262/92. The disclosed glass substrate comprises a glass substance including 60.0–70.0 wt % of $SiO_2$, 0.5–14.0 wt % of $Al_2O_3$, 10.0–32.0 wt % of alkali metal oxide, 1.0–15.0 wt % of ZnO, and 1.1–14.0 wt % of $B_2O_3$ and having a value not smaller than a specific value for each of a linear expansion coefficient, pressure strength, and transverse rupture strength.

As a material for preparing the chemically strengthened glass substrate, two kinds of glass substances described in the following (a) and (b) are known.

(a) A glass substance including 55–62 wt % of $SiO_2$, 10–18 wt % of $Al_2O_3$, 2–10 wt % of $ZrO_2$, 2–5 wt % of MgO, 0.1–3 wt % of BaO, 12–15 wt % of $Na_2O$, 2–5 wt % of $K_2O$, 0–7 wt % of $P_2O_3$, and 0.5–5 wt % of $TiO_2$, where the total amount of $Al_2O_3$ and $TiO_2$ is 13–20 wt % (see Japanese Unexamined Patent Publication (JP-A) No. 167245/89).

(b) A glass substance including 64–70 wt % of $SiO_2$, 14–20 wt % of $Al_2O_3$, 4–6 wt % of $Li_2O$, 7–10 wt % of $Na_2O$, 0–4 wt % of MgO, and 0–1.5 wt % of $ZrO_2$ (see Japanese Patent Publication (JP-B) No. 76224/94).

As regards a hard disk apparatus, technical innovations are being made from time to time in order to keep the superiority to other recording/reproducing apparatuses using various media, such as an optical recording medium and a magnetooptic recording medium. One of the technical innovations is to rotate the magnetic disk at a high speed Such high speed rotation deserves one attempt to increase an access speed of a recording/reproducing magnetic head. The rotation speed is expected to exceed 10000 rpm hereafter, although it has been restricted to 5000–7000 rpm in the prior art.

As described above, in the magnetic disk, high speed rotation is desired. If the high speed rotation is sought by the use of the conventional glass substrate for an information recording medium, it is difficult to keep a flying height constant, i.e., a distance between the magnetic head and the magnetic disk at the time of recording and reproducing.

SUMMARY OF THE INVENTION

It is a first object of this invention to provide a substrate which is easy in obtaining an information recording medium accommodating high speed rotation.

It is a second object of this invention to provide an information recording medium which is suitable for a recording/reproducing apparatus which rotates at a very high speed.

It is a third object of this invention to provide an information recording media which can simultaneously accomplish both a high Young's modulus and a low flying height.

It is a fourth object of this invention to provide an information recording medium which is capable of suppressing, due to a high Young's modulus, a vibration which results from a rotation of the information recording medium.

In order to achieve the above-mentioned object, the inventor has made extensive studies to reveal a cause which brings about a difficulty of keeping the flying height constant at a high speed rotation. As a result, it has been found out that deformation inevitably takes place in the information recording medium due to any resonance or the like during a high speed rotation and such deformation makes it difficult to keep a flying height constant. It has also been found out that, in order to prevent the deformation of the information recording medium by any resonance which occurs during a high speed rotation, it is preferred for the information recording medium to have a high Young's modulus.

Such a high Young's modulus is achieved in a crystallized glass substrate for an information recording medium. In the crystallized glass substrate, however, its strength and Young's modulus are controlled by its crystallinity. Therefore, in order to improve the strength and the Young's modulus, the ratio of crystals should be increased This roughens a surface smoothness (in terms of a surface roughness Rmax) of the information recording medium. Thus, it is difficult to assure a stable flying height at a high rotation speed even with the crystallized glass substrate.

According to this invention, it is possible to obtain a glass (amorphous glass) substrate for an information recording medium, which can achieve a high speed rotation. Such an information recording substrate according to this invention is based on a concept which is divided into first through sixth subsidiary aspects (1) to (6). Each of the first through the sixth subsidiary aspects is common to one another in view of the Young's modulus and the liguidus temperature. Each information recording substrate or medium based on the first through the sixth subsidiary aspects serves to form a first embodiment as enumerated below.

(1) A substrate (will be referred to as a glass substrate I hereinafter) for an information recording medium, comprising a glass substance having a Young's modulus not smaller than 100 GPa and a liquidus temperature not higher than 1350° C.

(2) A substrate (will be referred to as a glass substrate II hereinafter) for an information recording medium, comprising a glass substance at least including TiO2 and CaO as glass components, the contents of which are selected so that a Young's modulus is not smaller than 100 GPa and a liquidus temperature is not higher than 1350° C.

(3) A substrate (will be referred to as a glass substrate III hereinafter) for an information recording medium, comprising a glass substance at least including $TiO_2$ and CaO as glass components, the contents of which are selected so that a Young's modulus is not smaller than 100 GPa, a liquidus temperature is not higher than 1350° C., and a viscosity is not smaller than 10 poises in a formable temperature range.

(4) A substrate (will be referred to as a glass substrate IV hereinafter) for an information recording medium, comprising a glass substance at least including, as glass components, $TiO_2$, CaO, MgO, and $Al_2O_3$ along with at least $Li_2O$ selected from a group consisting of $Na_2O$ and $Li_2O$. The contents of the glass components are selected so that a Young's modulus is not smaller than 100 GPa, a liquidus temperature is not higher than 1350° C., a viscosity is not smaller than 10 poises in a formable temperature range, and specific gravity is not greater than 3.5 g/cm$^3$, (5) A substrate (will be referred to as a glass substrate V hereinafter) for an information recording medium, comprising a glass substance including as glass components 5–30 mol % of $TiO_2$, 10–45 mol % of (MgO+CaO), where CaO is 1–45 mol %, 3–30 mol % of ($Na_2O+Li_2O$), 0–15 mol % of $Al_2O_3$, and 35–60 mol % of $SiO_2$.

(6) A substrate (will be referred to as a glass substrate VI hereinafter) for an information recording medium, which is obtained by chemically strengthening one of the above-mentioned glass substrates I through V or a glass substance therefor.

On the other hand, an information recording substrate or medium which is capable of achieving the above-mentioned second object comprises a selected one of the above-mentioned glass substrates I through VI and a recording layer formed on the glass substrate.

In addition, it is possible to obtain an information recording substrate or medium based on seventh through ninth subsidiary aspects which are different from the first through the sixth subsidiary aspects and which belong to the same concept as the first through the sixth subsidiary aspects, Namely, the information recording substrate according to the seventh aspect essentially includes coexistence of $Y_2O_3$ and $TiO_2$ while the information recording substrate according to the eighth aspect of this invention includes coexistence of $TiO_2$, $Y_2O_3$, and $ZrO_2$. Moreover, the information recording substrate includes $TiO_2$ and at leased one of oxides selected from a group consisting of $Er_2O_3$, $Nd_2O_3$, $Sm_2O_3$, $Eu_2O_3$, $Gd_2O_3$, $Tb_2O_3$, $Dy_2O_3$, and $Yb_2O_3$. Each information recording substrate or medium according to the seventh through the ninth subsidiary aspects forms a second embodiment of this invention.

In the first and the second embodiments, it is noted that each glass substrate or medium, namely, each information recording substrate or medium can be also specified by a transition temperature or point which is equal to or less than 650° C., preferably, 550° C. and which is comparatively low in comparison with the conventional glass substrate mentioned in the previous application assigned to the same assignee.

Such a low transition temperature is effective to avoid a damage which might occur on a chemical strengthening process. More specifically, the glass substrate is usually immersed in fused salt to be chemically strengthened. In this event, the fused salt is generally kept during the chemical strengthening process at a temperature which is lowered by 100–150° C. from the transition temperature of the glass substrate. However, the fused salt starts to be decomposed at a temperature which is equal to or higher than 500° C. Such decomposed salt causes the damage to a surface of the glass substrate. Taking the above into consideration, it is readily understood that the transition temperature must not exceed 650° C., preferably, 550° C. so as to prevent the damage on the glass substrate, as mentioned before. In order to accomplish such a comparatively low transition temperature, alkali components, such as $Na_2O$, $Li_2O$, and alkaline earth components, MgO, CaO.

BRIEF DESCRIPTION OF DRAWING

FIGURE shows a correlation between a Young's modulus and a vibration which occurs on a rotation of each disk manufactured by information recording substrates.

DESCRIPTION OF PREFERRED EMBODIMENT

Description will now be made as regards a first embodiment of this invention with reference to the drawing.

At first, a glass substrate I of this invention will be described. As described above, the glass substrate I comprises a glass substance having a Young's modulus not smaller than 100 GPa and a liquidus temperature not higher than 1350° C. Herein, "a glass substrate" means a substrate comprising a glass (amorphous glass) substance which is Substantially free from crystal grains and is essentially different from crystallized glass or glass ceramics containing crystal grains.

As described above, it is desired to increase the Young's modulus in order to prevent the deformation of the glass substrate by a resonance which undesirably occurs when the glass substrate of a reduced thickness is rotated at high speed. For example, consideration will be made about a magnetic disk prepared from a glass substrate having a diameter of 3.5 inches and a thickness of 0.635 mm (25 mil: this is a typical thickness common to magnetic disk substrates currently used) is rotated at 10000 rpm. This situation will be referred to as "Case A". In this case, the constant flying height not higher than 1 μm is kept between the magnetic disk and the recording/reproducing head when the Young's modulus of the glass substrate is preferably equal to 100 GPa or more.

Furthermore, in order to obtain the glass substrate of this invention, it is required that substantially no crystal is precipitated during the manufacturing process. To this end, various steps such as a melting step, a forming step, and a cooling step in the manufacturing process must be carried out at temperatures not lower than a liquidus temperature of the glass substance. Note that, if the liquidus temperature Is extremely high, manufacture of the glass substrate is difficult and impractical, In view of the above, the glass substrate I of this invention is made from a glass substance having a Young's modulus not smaller than 100 GPa and a liquidus temperature not higher than 1350° C. Preferably, the Young's modulus is not smaller than 105 GPa. Preferably, the liquidus temperature is not higher than 1250° C. More preferably, the liquidus temperature is not higher than 1150° C.

Even if the Young's modulus of the glass substrate or the glass substance is not smaller than 100 GPa, deflection of the magnetic disk in the case A is liable to exceed 2 μm at maximum in case where the specific modulus is not greater than about 30×10$^6$ Nm/kg. It is noted that the specific gravity is a value calculated by dividing the Young's modulus by the specific gravity of the glass substrate. As a result, it is difficult to secure a stable flying height within a range not greater than 1 μm. in this connection, the specific gravity of the glass substrate I of this invention is preferably equal to about 3.5g/cm$^3$ or less and, more particularly, about 3.0 g/cm³ or less. The specific gravity is desired to be more and more reduced but, in case of silicate-based glass, is substantially be equal to 2.1 g/cm³ or more.

Even if the liquidus temperature of the glass substance is not higher than 1350° C., various disadvantages will arise in case where a viscosity of the glass substance in a formable temperature range, namely, a viscosity in a temperature range not lower than the liquidus temperature is extremely low. Specifically, such a low viscosity makes it difficult to control the flow of glass melt supplied to the forming step in the manufacturing process of the glass substrate. In addition, the degree of freedom for a formable shape is decreased. Therefore, the viscosity of the glass substance for the glass substrate I of this invention is preferably equal to approximate 10 poises or more and, more particular, 30 poises or more.

In the meanwhile, when information is recorded in the information recording medium, such as a magnetic disk, an optical disk, and a magnetooptic disk, or when the information is reproduced from the information recording medium, the information recording media is rotated while it is fixed by a clamp to a spindle of a drive motor arranged in the information processing apparatus. At this time, if a thermal expansion coefficient of the information recording media is remarkably different from that of the clamp, the following problem will arise.

Specifically, when the information recording medium is rotated, each of the information recording medium, the spindle, and the clamp rapidly becomes a high temperature, for example, up to about 90° C. due to heat generation by the drive motor. If the thermal expansion coefficients are much different between the information recording medium and the clamp as described alone, loosening may occur between the information recording medium and the clamp and distortion or deflection may be caused in the information recording medium as a result of the above-mentioned increase in temperature. This will bring about a deviation in position of a data recording site (track) in the information recording medium. Thus, recording or reproducing error is liable to occur. This problem becomes serious as the information recording medium becomes large in a diameter, such as 3.5 inches.

Therefore, it is preferred that the thermal expansion coefficient of the glass substrate I of this invention is approximate to that of the clamp as nearly as possible. Since the above-mentioned clamp is typically made from a stainless alloy, the thermal expansion coefficient of the glass substrate I of this invention is preferably within a range between 7 and 14 ppm/°C. (between $7 \times 10^{-6}$ and $14 \times 10^{-6}$/°C.), more preferably, between 9 and 12 ppm/°C. (between $9 \times 10^{-6}$ and $12 \times 10^{-6}$/°C.). It is noted that the thermal expansion coefficient referred to herein is a mean coefficient of linear thermal expansion of a temperature range between 100 and 300° C.

Next, description will be made as regards a glass substrate II of this invention.

As described above, the glass substrate II of this invention comprises a glass substance at least including $TiO_2$ and CaO as glass components, the contents of which are selected so that a Young's modulus is not smaller than 100 GPa and a liquidus temperature is not higher than 1350° C.

The Young's modulus not smaller than 100 GPa and the liquidus temperature not higher than 1350° C. are selected for the glass substance forming the glass substrate II because of the same reason as described in conjunction with the glass substrate I. The preferable ranges for these physical properties are similar to those described in conjunction with the glass substrate I.

In order to obtain a glass substance having a high Young's modulus, $TiO_2$ is preferably included as a glass component. In order to obtain a glass substance having a high Young's modulus and a low liquidus temperature, CaO is preferably included as a glass component.

Therefore, the glass substrate II of this invention is formed by the glass substance at least including $TiO_2$ and CaO as glass components. The contents of $TiO_2$ and CaO are selected so that the glass substance has the Young's modulus not smaller than 100 GPa and the liquidus temperature not higher than 1350° C., depending on the kinds and the contents of other glass components.

Because of the same reason as described in conjunction with the glass substrate I, the specific gravity of the glass substrate II is preferably equal to about 3.5 g/cm³ or less and, more particularly, about 3.0 g/cm³ or less Likewise, the thermal expansion coefficient of the glass substrate II preferably falls within a range between 7 and 14 ppm/°C., more particularly, between 9 and 12 ppm/°C. (between $9 \times 10^{-6}$ and $12 \times 10^{-6}$/°C.).

Next, description will be made as regards a glass substrate III of this invention.

As described above, the glass substrate III of this invention comprises the glass substance at least including $TiO_2$ and CaO as glass components, the contents of which are selected so that a Young's modulus is not smaller than 100 GPa, a liquidus temperature is not higher than 1350° C., and a viscosity in a formable temperature range is not smaller than 10 poises.

The Young's modulus not smaller than 100 GPa, the liquidus temperature not higher than 1350° C., and the viscosity in the formable temperature range not smaller than 10 poises are selected for the glass substance forming the glass substrate III because of the same reason as described in conjunction with the glass substrate I. The preferable ranges for these physical properties are similar to those described in conjunction with the glass substrate I.

The glass substrate III is formed by the glass substance at least including $TiO_2$ and CaO because of the same reason as described in conjunction with the glass substrate II. The contents of $TiO_2$ and CaO are selected so that the glass substance has the Young's modulus not smaller than 100 GPa, the liquidus temperature not higher than 1350° C., and the viscosity not smaller than 10 poises in the formable temperature range, depending on the kinds and the contents of other glass components.

Because of the sow reason as described in conjunction with the glass substrate I, the specific gravity of the glass substrate III is preferably equal to about 3.5 g/cm³ or less, more particularly, about 3.0 g/cm³ or less. Likewise, the thermal expansion coefficient of the glass substrate III preferably falls within a range between 7 and 14 ppm/°C. (between $7 \times 10^{-6}$ and $14 \times 10^{-6}$/°C.), more particularly, between 9 and 12 ppm/°C. (between $9 \times 10^{-6}$ and $12 \times 10^{-6}$/°C.).

Next, description will be made as regards a glass substrate TV of this invention.

As described above, the glass substrate IV of this invention comprises the glass substance at least including, as glass components, $TiO_2$, CaO, MgO, and $Al_2O_3$ along with at least $Li_2O$ selected from a group consisting of $Na_2O$ and $Li_2O$. The contents of the glass components are selected so that a Young's modulus is not smaller than 100 GPa, a liquidus temperature is not higher than 1350° C., a viscosity in a formable temperature range is not smaller than 10 poises, and a specific gravity is not greater than 3.5 g/cm³.

The Young's modulus not smaller than 100 GPa, the liquidus temperature not higher than 1350° C., the viscosity in the formable temperature range not smaller than 10 poises, and the specific gravity not greater than 3.5 g/cm³ are selected for the glass substance forming the glass substrate IV because of the same reason as described in conjunction with the glass substrate I. The preferable ranges for these physical properties are similar to those described in conjunction with the glass substrate I of this invention.

As described in conjunction with the glass substrate I, $TiO_2$ is a glass component effective in obtaining the glass substance having a high Young's modulus. CaO is a glass component effective in obtaining the glass substance having a high Young's modulus and a low liquidus temperature. However, CaO tends to increase the specific gravity.

MgO also acts as a glass component effective in obtaining the glass substance having a high Young's modulus. However, as compared with CaO, MgO tends to objectionably increase the liquidus temperature. In addition, MgO also has a function of reducing the specific gravity.

$Na_2O$ tends to reduce the Young's modulus but remarkably contributes to a decrease of the liquidus temperature of the glass substance. Such decrease in liquidus temperature by presence of $Na_2O$ is augmented when $Na_2O$ and $TiO_2$ coexist. $Na_2O$ is also useful in obtaining the glass substance having a high thermal expansion coefficient.

$Li_2O$ is a glass component effective in improving the meltability of the glass substance without decreasing the Young's modulus. $Li_2O$ also enables augmentation in strength by chemical strengthening.

$Al_2O_3$ is a glass component which has no concern with the Young's modulus. However, $Al_2O_3$ is a component effective in decreasing the liquidus temperature of the glass substance, suppressing the phase separation tendency, and improving the viscosity in a working temperature range and a chemical strengthening characteristic.

Therefore, the glass substrate IV is formed by the glass substance at least including the above-mentioned six kinds of the glass components. The content of each of these glass components is selected so that the glass substance having the Young's modulus not smaller than 100 GPa, the liquidus temperature not higher than 1350° C., the viscosity not smaller than 10 poises in the formable temperature range, and the specific gravity not greater than 3.5 g/cm³ is obtained, depending on the kinds and the contents of the other glass components (including ones except for the above-mentioned six kinds of the glass components).

Because of the same reason as described in conjunction with the glass substrate I, the thermal expansion coefficient of the glass substrate IV preferably falls within a range between 7 and 14 ppm/°C. (between $7\times10^{-6}$ and $14\times10^{-6}/$°C.), more particularly, between 9 and 12 ppm/°C. (between $9\times10^{-6}$ and $12\times10^{-6}/$°C.).

Next, description will be made as regards a glass substrate V of this invention.

As described above, the glass substrate V of this invention comprises the glass substance including as glass components 0.1–30 mol % of $TiO_2$, 1–45 mol % of CaO, 5–40 mol % of (MgO+CaO), 3–30 mol % of ($Na_2O+Li_2O$), less than 15 mol % of $Al_2O_3$, and 35–65 mol % of $SiO_2$.

The above-mentioned amount of (CaO+MgO) falls preferably within a range between 5–35 mol %. In this case, the amount of $SiO_2$ may be kept at the above range or may be changed to a range which exceeds 55 mol % and does not exceed 65 mol % in consideration of water durability. Furthermore, the amount of $Al_2O_3$ may be less thn 5 mol %.

With the above-mentioned composition, it is easy to obtain the glass substance having a Young's modulus not smaller 100 GPa, a liquidus temperature not higher than 1350° C., a viscosity in a formable temperature range not smaller than 10 poises, and a specific gravity not greater than 3.5 g/cm³.

As described above, $TiO_2$ acts as a glass component which is effective in obtaining the glass substance having a high Young's modulus. In order to obtain the glass substance having the Young's modulus not smaller than 100 GPa, the content of $TiO_2$ is preferably equal to 0.1 mol % or more. However, if the content exceeds 30 mol %, devitrification resistance of the glass substance is decreased. This results in difficulty in obtaining the glass substance having the liquidus temperature not higher than 1350° C.

CaO serves as a glass component effective in obtaining the glass substance having a high Young's modulus and a low liquidus temperature. In order to obtain the glass substance having the Young's modulus not smaller than 100 GPa and the liquidus temperature not higher than 1350° C., the content of CaO is preferably equal to I mol % or more. However, if the content exceeds 45 mol %, glass formation is difficult.

MgO also acts as a glass component effective to form the glass substance which has a high Young's modulus and a low specific gravity. However, MgO tends to objectionably increase the liquidus temperature of the glass substance. Therefore, the amount of MgO may be restricted so that the total amount of MgO and CaO is between 10 and 45 mol %. Specifically, the amount of MgO falls within a range between 5 and 40 mol %. In any event, MgO coexists with CaO in the glass substrate or information recording substrate according to the first through the fifth subsidiary aspects.

$Na_2O$ tends to reduce the Young's modulus but remarkably contributes to a decrease of the liquidus temperature of the glass substance. Such a decrease in liquidus temperature by presence $Na_2O$ is augmented when $Na_2O$ and $TiO_2$ coexist in the glass substrate. Therefore, particularly when a comparatively large amount of $TiO_2$, for example, no less than 5 mol % of $TiO_2$ is included, it is preferred that $Na_2O$ is also included. $Na_2O$ is also useful in obtaining the glass substance having a large thermal expansion coefficient. Therefore, the thermal expansion coefficient of the glass substance can be adjusted by appropriately selecting the content of $Na_2O$. On the other hand, $Li_2O$ is a glass component effective in improving the meltability of the glass substance without decreasing the Young's modulus. In addition, $Li_2O$ also enables augmentation in strength by chemical strengthening. From the above-mentioned reasons, the total content of $Na_2O$ and $Li_2O$ is preferably equal to 3 mol % or more. However, if the total content of $Na_2O$ and $Li_2O$ exceeds 30 mol %, chemical durability of the glass substance is deteriorated. In this case, when an information recording medium is obtained by forming a magnetic recording layer on the glass substrate, alkali ions are often diffused from the glass substrate to the recording layer. Preferably, the total amount of $Na_2O$ and $Li_2O$ is between 5 and 22 mol %.

It is not always essential to include $Al_2O_3$ because $Al_2O_3$ does not contribute to an increase of the Young's modulus. However, $Al_2O_3$ is a glass component effective in decreasing the liquidus temperature of the glass substance, suppressing the phase separation tendency, and improving the viscosity in the working temperature range and the chemical strengthening characteristic. In view of the above, $Al_2O_3$ may be included if necessary. However, if the content or amount of $Al_2O_3$ exceeds 15 mol %, problems would often arise, such as considerable increase in liquidus temperature and presence of unmelted materials resulting from deterioration in meltability.

$SiO_2$ is a component forming a glass structure. In order to obtain the glass substance having the liquidus temperature not higher than 1350° C., the content of $SiO_2$ is preferably equal to 35 mol % or more. However, if the content exceeds 65 mol %, it is difficult to obtain the glass substance having the Young's modulus not smaller than 100 GPa. More preferably, the content of $SiO_2$ is between 35 and 65 mol %. Considering water durability, $SiO_2$ influences dissolution of alkali ions into water and the like and may be preferably restricted to a range between 40 and 60 mol % in view of the water durability.

Because of the same reason as described in conjunction with the glass substrate I, the glass substrate V preferably has the Young's modulus not smaller than 100 GPa, the liquidus temperature not higher than 1350° C., the viscosity in the formable temperature range not smaller than 10 poises, the specific gravity not greater than 3.5 g/cm$^3$, and the thermal expansion coefficient approximately between 7 and 14 ppm/°C. (between $7 \times 10^{-6}$ and $14 \times 10^{-6}$/°C.). In order to obtain the glass substrate V having the above-mentioned desired physical properties, the content of each glass component is suitably selected within the above-mentioned range. The preferable ranges for these physical properties are similar to those described in conjunction with the glass substrate I.

The glass substrate V is preferably made from the glass substance including 5–15 mol % of $TiO_2$, 4–20 mol % of CaO, 5–30 mol % of (MgO+CaO), 5–22 mol % of ($Na_2O$+$Li_2O$), 0–8 mol % of $Al_2O_3$, and 40–60 mol % of $SiO_2$.

In the foregoing, description has bean made about the glass substrates I through V. It is noted here that, in the glass substrates comprising the glass substance including $TiO_2$ as an essential glass component, namely, the glass substrates II, III, IV, and V, a part or a whole of $TiO_2$ may be replaced by transition metal oxide or oxides (except titanium oxide). Such transition metal oxide or oxides may be selected from a group consisting of oxides of Cr, A, Fe, Co, Ni, Ga, Ge, Y, Zx, Nb, Mo, La, Ce, Pr, Nd, Pn, Eu, Gd, Tb, Dy, Ho, Er, Tn, Yb, Hf, Ta, and W. Alternatively, the at least one transition metal oxide may be selected from a group consisting of oxides of Cu, V, and Zn, although the latter is inferior to the former in Young's modulus. Among the above-enumerated metal oxides, it has been found out that $Y_2O_3$ is useful to increase the Young' modulus without an increase of the specific gravity. At any rate, the amount of such transition metal oxide falls within a range between 0.1 and 15 mol %, preferably, between 0.1 and 8 mol %. The transition metal oxide tends to slightly hinder an improvement of the Young's modulus when such transition metal oxide coexists with more than 10 mol % of $TiO_2$. Under the circumstances, coexistence of the above-enumerated transition metal oxide with $TiO_2$ contributes to an improvement of the Young's modulus as compared with only $TiO_2$ on the condition that $TiO_2$ does not exceed 10 mol %.

However, transition metal oxide mentioned above is not so effective in improving the Young's modulus of the glass substance but tends to increase the specific gravity. Therefore, the content of transition metal oxide must be suitably selected, depending on the kinds and the contents of the other glass components, so that the desired glass substrate is obtained. If $ZrO_2$ is used as the transition metal oxide, the content of $ZrO_2$ is preferably equal to 10 mol % or less, more particularly, 4 mol % or less When the content is not greater than 5 mol %, the liquidus temperature can be slightly lowered.

It is possible to obtain the glass substrates I through V of this invention with and without chemical strengthening. If the chemical strengthening (by means of low-temperature ion exchange) is carried out, the glass substance before chemical strengthening preferably includes, as glass components, at least 40 mol % of ($SiO_2$+$Al_2O_3$), at least 3 mol % of $Li_2O$, at least 5 mol % of ($Na_2O$+$Li_2O$), and at most 35 mol % of (CaO+MgO).

In the above-mentioned case, the content of $SiO_2$ is preferably equal to 40 mol % or more in order to form a sufficient compressive stress layer by a chemical strengthening process. It is noted here that a part of $SiO_2$ can be replaced by $Al_2O_3$. Therefore, the total amount of $SiO_2$ and $Al_2O_3$ preferably falls within a range between 40 mol % and 80 mol %. More preferably, the total amount of $SiO_2$ and $Al_2O_3$ is equal to 44 mol % or more.

$Li_2O$ and $Na_2O$ serve to introduce into the glass substance Li+ ions and Na+ ions required in chemical strengthening process. In order to form the sufficient compressive stress layer, it is preferable that the content of $Li_2O_3$ is not smaller than 3 mol % and the total amount of $Na_2O$ and $Li_2O$ is not smaller than 5 mol %. On the other hand, the total amount of alkali components, such as $Na_2O$ and $Li_2O$, is preferably restricted to a range which does not exceed 22 mol % so as to avoid dissolution of alkali ions.

On the other hand, CaO and MgO are the glass components effective in adjusting the Young's modulus, the liquidus temperature, and the viscosity in the formable temperature range of the glass substance. However, these components prevent the movement of alkali ions during the chemical strengthening process. Therefore, in order to form the sufficient compressive stress layer, it is preferred teat the total amount of $CaO_2$ and MgO is not greater than 35 mol %.

Next, description will be made as regards a glass substrate VI of this invention.

As described above, the glass substrate VI of this invention is formed by chemically strengthening by one of the glass substrates I through V or by chemically strengthening the glass substance therefor.

Chemical strengthening is an effective measure in obtaining a glass substrate having high impact resistance. For example, chemical strengthening by the use of low-temperature ion exchange is performed by dipping the glass substance to be chemically strengthened into a prescribed fused salt which comprises carbonate or nitrate of potassium or sodium or a mixture thereof and which is held at a temperature between 50 and 150° C. lower than a transition point Tg of the glass substance to be chemically strengthened.

The glass substrates I through VI of this invention described above are made from amorphous glass which has a high Young's modulus not smaller than 100 GPa (glass substrates I through IV and VI) or can easily provide a Young's modulus not smaller than 100 GPa (glass substrates V and VI) and which has a liquidus temperature not higher than 1350° C. Therefore, it is easy to obtain from these glass substrates an information recording medium which can be used at a high speed rotation.

The glass substrates I through VI of this invention having the above-mentioned advantages are particularly adapted for use as a substrate for a magnetic disk. In addition, these substrates are also suitable as a substrate for a magnetooptic disk or an optical disk.

Next, description will be made as regards au information recording medium of this invention.

As described above, the information recording medium of this invention comprises any one of the above-mentioned glass substrates I through VI and the recording layer formed on the glass substrate.

It is noted that "the recording layer formed on the glass substrate" means a layer which is formed on a surface of the glass substrate directly or via any other desired layer, such as an underlying layer or layers, and which has a single-layer structure or a multi-layer structure. The material and the layer structure of the recording layer are appropriately selected so as to serve as a magnetic recording layer, a magnetooptic recording layer, an erasable recording layer, and a phase-variable recording layer corresponding to the type of a desired information recording medium.

The above-mentioned information recording medium essentially comprises as a substrate any one of the above-mentioned glass substrates I through VI and the recording layer and may further comprise, like in the prior art, a protection layer and a lubrication layer in dependence upon the type of the desired information recording medium. In dependence upon the type of the information recording medium, the recording layer nay be interposed between two substrates. In this structure, it is essential to use any one of the glass substrates I through VI as at least one of the two substrates.

The information recording medium of this invention easily meets the increase in rotation speed since the substrate comprises any one of the above-mentioned glass substrates I through VI of this invention. As a result, it is easy to obtain a recording/reproducing apparatus having a high access speed (for example, an auxiliary recording unit used in a personal computer or a server-and-client system) by the use of the information recording medium of this invention.

Next, description will be made as regards specific examples of this invention. Note that the present invention is not restricted by the following examples. For glass substrates obtained in the following examples, the thickness of the compressive stress layer and the physical properties are obtained in the following manner.

1. Thickness of Compressive Stress Layer

Measurement was made by the use of the precision strainmeter (Babinet compensation) manufactured by Toshiba Glass K.K.

2. Physical Properties (1) Young's Modulus

Each sample having a dimension of 20×20×100 mm was prepared. An ultrasonic wave of 5 MHz is made to propagate through the sample to measure a velocity of longitudinal wave (V1) and a velocity of transversal wave (Vs) by the use of the sing-around sound ultrasonic measuring equipment (UVM-2 manufactured by Ultrasonic Engineering Co., Ltd.). Then, the Young's modulus was calculated by the following equation.

$$\text{Young's modulus} = (4G^2 - 3G \cdot V1^2 \cdot \rho)/(G - V1^2 \cdot \rho) \quad G = Vs^2 \cdot \rho$$

where $\rho$ represents the specific gravity (g/cm$^3$) of the sample.

(2) Specific Modulus

Specific Modulus was calculated by dividing the Young's modulus of the sample by its specific gravity.

(3) Liquid-Phase Temperature

The sample was put into a platinum container and was placed in a temperature gradient furnace. After the lapse of thirty minutes, the surface and the interior of the sample were observed by an optical microscope for presence or absence of crystals. The liquidus temperature was defined as a lowest temperature with no crystal precipitated.

(4) Viscosity

The viscosity was measured at various temperatures in a range from the melting temperature to the liquidus temperature by the use of the rotating cylinder viscometer which is manufactured by Tokyo Industries, Inc. and which has a platinum container and a platinum rotor.

(5) Glass Transition Point (Tg)

For the sample having a dimension of 5 mmΦ×20 mm, the glass transition point was measured by the use of the thermochemical analyzer (TMA8140) manufactured by Rigaku Corp. at a heating rate of +4° C./min. As a reference sale, SiO$_2$ was used.

(6) Thermal Expansion Coefficient

As the thermal expansion coefficient, a mean coefficient of linear thermal expansion in a temperature range between 100° C. and 300° C. was measured simultaneously when the glass transition point was measured.

(7) Surface Roughness (Rmax)

The surface roughness was measured by the use of the AFM NanoScope 3A manufactured by Digital Instrument Corp.

EXAMPLES 1–20

In order to obtain glass sales having oxide compositions indicated in Tables 1 through 5, glass materials, such as silicate powder, aluminum hydroxide, alumina, lithium carbonate, lithium sulfate, sodium carbonate, sodium nitrate, calcium carbonate, magnesium carbonate, magnesium oxide, titanium oxide, iron oxide, nickel oxide, yttrium ode, lantern oxide, neodymium oxide, copper oxide, antimony oxide, and arsenious acid were weighted or measured. Thereafter, the mixture of 100 kg was prepared for each example.

Next, melted glass was prepared in the following manner by the use of an atmosphere-heating type semicontinuous melting equipment of platinum. The melting equipment comprises a melting furnace having an internal volume of 2 liters, a working tank connected to the melting furnace having an internal volume of 30 liters with a stirrer, and a cylindrical outflow tube having an inner diameter between 5 mm and 20 mm and connected to the working tank. Specifically, the mixture, was put in the melting furnace to be melted in a temperature between 1350° C. and 1450° C. and then stirred in the working tank to be clarified or refined. Thus, melted glass was obtained.

The melted glass thus obtained was flown out from the cylindrical outflow tube at a temperature slightly higher than the liquidus temperature. After received on a molding die (lower die) having a circular shape of a diameter of 100 mm and made from cast iron, the melted glass was quickly pressed on an upper die made from cast iron and then annealed to obtain a disk-shaped object having a diameter of about 100 mm and a thickness of 1 mm.

Thereafter, the above-mentioned disk-shaped object was subjected to a grinding process and a polishing process (using a cerium oxide polisher) to obtain a disk-shaped glass substrate having a dimension of 3.5 inches Φ×0.635 mm.

In each example excluding Examples 25 and 26, the glass substrate was chemically strengthened in the following manner to obtain the glass substrate.

At first, a salt mixture of $NaNO_3$ and $KNO_3$ at a weight ratio of 6:4 was prepared. The salt mixture was heated to a temperature which is 100° C. lower than the glass transition point (Tg) of the glass substrate to be chemically strengthened and was melted into fused salt. Then, the glass substrate was dipped into fused salt for nine hours to be chemically strengthened.

The thickness of the compressive stress layer in each glass substrate (excluding the glass substrate in Examples 25 and 26) thus obtained are indicated in Tables 1 through 5 together with the physical property. The Young's modulus, the specific modulus, the surface roughness (Rmax), and the specific gravity were measured about the glass samples which were subjected to a chemical strength process except for the glass substrates of Examples 25 and 26). On the other hand, the liquidus temperature, the viscosity, the glass transition point, and the thermal expansion coefficient were measured by the use of the glass samples which were not chemically strengthened.

Comparative Example 1

Glass materials were weighted so as to obtain a comparative glass sale having a substantially same composition (in terms of mol %) described in Japanese Unexamined Patent Publication (JP-A) No. 167245/89. In the manner similar to Examples 1 through 30, a glass substrate (before chemically strengthened) was obtained and thereafter chemically strengthened under the condition

TABLE 1

| | | Example | | | | | |
|---|---|---|---|---|---|---|---|
| | | 1 | 2 | 3 | 4 | 5 | 6 |
| Glass Composition (mol %) | SiO2 | 50 | 42 | 46 | 35 | 42 | 40 |
| | Al2O3 | 8 | 2 | — | 8 | 6 | 10 |
| | Li2O | 6 | 5 | 6 | 4 | 4 | 2 |
| | Na2O | — | 5 | 4 | 6 | 8 | 7 |
| | Li2O + Na2O | 6 | 10 | 10 | 10 | 12 | 9 |
| | CaO | 15 | 13 | 20 | 18 | 8 | 12 |
| | MgO | 15 | 10 | 10 | 12 | 2 | 12 |
| | CaO + MgO | 30 | 23 | 30 | 30 | 10 | 24 |
| | TiO2 | 6 | 23 | 14 | 15 | 30 | 15 |
| | Other Components | | | | Fe2O3 2 | | Y2O3 2 |
| Thickness of Compressive Stress Layer (μm) | | 40 | 55 | 75 | 20 | 65 | 40 |
| Physical Properties | Young's Modulus (GPa) | 104 | 113 | 110 | 104 | 104 | 103 |
| | Specific Gravity (g/cm³) | 2.75 | 3.10 | 2.90 | 2.96 | 2.95 | 2.91 |
| | Specific Modulus (× 10⁶ Nm/kg) | 37.8 | 36.5 | 37.9 | 35.2 | 35.3 | 35.4 |
| | Liquidus Temperature (° C.) | 1120 | 1180 | 1150 | 1180 | 1210 | 1180 |
| | Viscosity (poise) at 1200° C. | 10 | 20 | 30 | 20 | 30 | 40 |
| | at 1100° C. | 50 | — | — | — | — | — |
| | at 1250° C. | — | — | — | — | — | — |
| | Thermal Expansion Coefficient (ppm/° C.) | 7.0 | 8.6 | 9.1 | 9.3 | 8.4 | 8.4 |
| | Glass Transition Point (Tg: ° C.) | 620 | 615 | 575 | 610 | 650 | 645 |
| | Surface Roughness (Ra: Å) | 3 | 3 | 4 | 4 | 3 | 4 |

TABLE 2

| | | Example | | | | | |
|---|---|---|---|---|---|---|---|
| | | 7 | 8 | 9 | 10 | 11 | 12 |
| Glass Composition (mol %) | SiO2 | 40 | 48 | 60 | 42 | 50 | 40 |
| | Al2O3 | 2 | — | — | — | 3 | 4 |
| | Li2O | 6 | 18 | 6 | 12 | 10 | 2 |
| | Na2O | 2 | — | 3 | 18 | 5 | 3 |
| | Li2O + Na2O | 8 | 18 | 9 | 30 | 15 | 5 |
| | CaO | 15 | 20 | 9 | 1 | 8 | 45 |
| | MgO | 30 | — | 9 | 13 | 10 | — |
| | CaO + MgO | 45 | 20 | 18 | 14 | 18 | 45 |
| | TiO2 | 5 | 7 | 11 | 14 | 12 | 6 |

TABLE 2-continued

| | | Example | | | | | |
|---|---|---|---|---|---|---|---|
| | | 7 | 8 | 9 | 10 | 11 | 12 |
| | Other Components | | ZrO2 4 Nb2O5 2 La2O3 1 | ZrO2 2 | | NiO 2 | |
| Thickness of Compressive Stress Layer (μm) | | 20 | 40 | 70 | 40 | 80 | 30 |
| Physical Properties | Young's Modulus (GPa) | 115 | 110 | 102 | 102 | 104 | 109 |
| | Specific Gravity (g/cm³) | 2.88 | 3.00 | 2.79 | 2.76 | 2.77 | 2.99 |
| | Specific Modulus (× 10⁶ Nm/kg) | 40.0 | 36.7 | 36.6 | 37.0 | 37.6 | 36.5 |
| | Liquidus Temperature (° C.) | 1150 | 1000 | 1080 | 1190 | 1150 | 1090 |
| | Viscosity at 1200° C. (poise) | 20 | 5 | 40 | 20 | 10 | 20 |
| | at 1100° C. | — | 15 | 80 | — | — | — |
| | at 1250° C. | — | — | — | — | — | — |
| | Thermal Expansion Coefficient (ppm/° C.) | 9.0 | 9.5 | 7.3 | 13.7 | 9.2 | 9.6 |
| | Glass Transition Point (Tg: ° C.) | 570 | 535 | 605 | 420 | 537 | 595 |
| | Surface Roughness (Ra: Å) | 4 | 3 | 3 | 4 | 3 | 3 |

TABLE 3

| | | Example | | | | | |
|---|---|---|---|---|---|---|---|
| | | 13 | 14 | 15 | 16 | 17 | 18 |
| Glass Composition (mol %) | SiO2 | 54 | 44 | 45 | 42 | 46 | 44 |
| | Al2O3 | — | 2 | 2 | — | — | — |
| | Li2O | 12 | 9 | 10 | 4 | 4 | 4 |
| | Na2O | 8 | 4 | 3 | 5 | 6 | 5 |
| | Li2O + Na2O | 20 | 13 | 13 | 9 | 10 | 9 |
| | CaO | 2 | 14 | 13 | 15 | 15 | 14 |
| | MgO | 8 | 14 | 13 | 15 | 13 | 14 |
| | CaO + MgO | 10 | 28 | 25 | 30 | 28 | 28 |
| | TiO2 | 16 | 13 | 14 | 15 | 12 | 15 |
| | Other Components | | | | Nb2O5 2 La2O3 2 | Nd2O3 2 ZrO2 2 | CuO 2 ZrO2 2 |
| Thickness of Compressive Stress Layer (μm) | | 40 | 65 | 40 | 25 | 40 | 30 |
| Physical Properties | Young's Modulus (GPa) | 102 | 109 | 111 | 112 | 102 | 110 |
| | Specific Gravity (g/cm³) | 2.73 | 2.87 | 2.86 | 3.22 | 2.73 | 3.00 |
| | Specific Modulus (×10⁶ Nm/kg) | 37.4 | 38.0 | 38.9 | 34.9 | 37.4 | 36.7 |
| | Liquidus Temperature (° C.) | 1200 | 1020 | 1080 | 1150 | 1200 | 1180 |
| | Viscosity at 1200° C. (poise) | 20 | 10 | 30 | 20 | 15 | 30 |
| | at 1100° C. | — | 30 | — | — | — | — |
| | at 1250° C. | — | — | — | — | — | — |
| | Thermal Expansion Coefficient (ppm/° C.) | 9.8 | 8.4 | 8.4 | 9.1 | 9.8 | 8.9 |
| | Glass Transition Point (Tg: ° C.) | 505 | 650 | 645 | 600 | 505 | 605 |
| | Surface Roughness (Ra: Å) | 3 | 4 | 3 | 4 | 4 | 3 |

TABLE 4

| | | Example | | | | | |
|---|---|---|---|---|---|---|---|
| | | 19 | 20 | 21 | 22 | 23 | 24 |
| Glass Composition (mol %) | SiO2 | 40 | 45 | 45 | 44 | 45 | 44 |
| | Al2O3 | — | 2 | 2 | 2 | 1 | 2 |
| | Li2O | 4 | 10 | 10 | 10 | 12 | 13 |
| | N2O | — | 3 | 2 | 4 | 5 | 5 |
| | Li2O + Na2O | 4 | 13 | 12 | 14 | 17 | 18 |
| | CaO | 36 | 11 | 10 | 14 | 13 | 13 |
| | MgO | — | 15 | 15 | 15 | 13 | 12 |
| | CaO + MgO | 36 | 26 | 25 | 29 | 26 | 25 |
| | TiO2 | 8 | 14 | 14 | 11 | 11 | 11 |
| | Other Components | La2O3 1 ZrO2 5 Nb2O5 6 | | ZrO2 2 | | | |
| Thickness of Compressive Stress Layer (μm) | | 10 | 40 | 40 | 50 | 60 | 50 |
| Physical Properties | Young's Modulus (GPa) | 115 | 110 | 111 | 109 | 108 | 107 |
| | Specific Gravity (g/cm³) | 3.51 | 2.86 | 2.92 | 2.86 | 2.83 | 2.82 |
| | Specific Modulus (× 10⁶ Nm/kg) | 32.8 | 38.5 | 38.1 | 38.1 | 38.1 | 37.8 |
| | Liquidus Temperature (° C.) | 1200 | 1100 | 1100 | 1070 | 1080 | 1050 |
| | Viscosity at 1200° C. | 20 | 10 | 20 | 10 | 10 | <10 |
| | (poise) at 1100° C. | — | 30 | 40 | 20 | 20 | 10 |
| | at 1250° C. | — | — | — | — | — | — |
| | Thermal Expansion Coefficient (ppm/° C.) | 8.9 | 9.3 | 9.4 | 10.1 | 10.7 | 11.0 |
| | Glass Transition Point (Tg: ° C.) | 670 | 560 | 565 | 540 | 530 | 520 |
| | Surface Roughness (Ra: Å) | 4 | 3 | 3 | 4 | 3 | 4 |

TABLE 5

| | | Example | | | | | |
|---|---|---|---|---|---|---|---|
| | | 25 | 26 | 27 | 28 | 29 | 30 |
| Glass Composition (mol %) | SiO2 | 39 | 46 | 46 | 45 | 37 | 38 |
| | Al2O3 | — | — | 2 | 4 | 2 | 2 |
| | Li2O | 5 | 8 | 10 | 7 | 4 | 9 |
| | Na2O | — | — | 3 | 4 | 2 | 2 |
| | Li2O + Na2O | 5 | 8 | 13 | 11 | 6 | 11 |
| | CaO | 33 | 7 | 9 | 13 | 19 | 14 |
| | MgO | — | — | 17 | 13 | 24 | 15 |
| | CaO + MgO | 33 | 7 | 26 | 26 | 44 | 29 |
| | TiO2 | 10 | 7 | 13 | 14 | 14 | 16 |
| | Other Components | La2O3 1 ZrO2 6 Nb2O5 6 | La2O3 7 ZrO2 2 ZnO 23 | | | | ZrO2 4 |
| Thickness of Compressive Stress Layer (μm) | | — | — | 50 | 70 | 15 | 20 |
| Physical Properties | Young's Modulus (GPa) | 116 | 108 | 110 | 108 | 118 | 120 |
| | Specific Gravity (g/cm³) | 3.53 | 3.93 | 2.88 | 2.86 | 3.05 | 3.05 |
| | Specific Modulus (× 10⁶ Nm/kg) | 32.9 | 27.5 | 38.1 | 37.8 | 38.8 | 39.5 |
| | Liquidus Temperature (° C.) | 1220 | 1230 | 1100 | 1100 | 1230 | 1230 |
| | Viscosity at 1200° C. | <10 | — | 20 | 30 | — | — |
| | (poise) at 1100° C. | — | — | — | 80 | — | — |
| | at 1250° C. | — | <10 | — | — | 10 | 20 |

TABLE 5-continued

|  | Example | | | | | |
|---|---|---|---|---|---|---|
|  | 25 | 26 | 27 | 28 | 29 | 30 |
| Thermal Expansion Coefficient (ppm/° C.) | 8.9 | 7.9 | 9.4 | 8.7 | 8.8 | 9.1 |
| Glass Transition Point (Tg: ° C.) | 660 | 580 | 560 | 580 | 537 | 595 |
| Surface Roughness (Ra: Å) | 4 | 4 | 3 | 3 | 5 | 4 | similar to Examples 1 through 30 to obtain a desired glass substrate.

The thickness of the compressive stress layer, the Young's modulus, the specific gravity, the specific modulus, and the glass transition point of the glass substrate were similarly obtained and shown in Table 6.

Comparative Example 2

Glass materials were weighted so as to obtain a comparative glass sample having a substantially same composition (in terns of mol %) described in Japanese Patent Publication (JP-B) No. 76224/06. In the manner similar to Examples 1 through 30, a glass substrate (before chemically strengthened) was obtained and thereafter chemically strengthened under the condition similar to Examples 1 through 30 to obtain a desired glass substrate.

The thickness of the compressive stress layer, the Young's modulus, the specific gravity, the specific modulus, and the liquidus temperature of the glass substrate were similarly obtained and shown in Table 6.

Comparative Example 3

Glass materials were weighted so as to obtain a comparative glass sample having a substantially same composition (in terms of mol %) described in Japanese Patent publication (JP-B) No. 70262/92, In the manner similar to Examples 1 through 30, the glass substrate (before chemically strengthened) was obtained and thereafter comically strengthened under the condition

TABLE 6

|  |  | Comparative Example | | | |
|---|---|---|---|---|---|
|  |  | 1 | 2 | 3 | 4 |
| Glass | SiO2 | 64.2 | 68.5 | 67.2 | 52.0 |
| Composi- | Al2O3 | 7.6 | 8.8 | 1.8 | 1.0 |
| tion | Li2O | — | 10.0 | — | — |
| (mol %) | Na2O | 14.5 | 8.2 | 9.4 | 7.0 |
|  | K2O | 2.0 | — | 6.2 | 5.0 |
|  | CaO | — | — | 0.1 | 16.0 |
|  | MgO | 6.4 | 4.5 | 4.5 | — |
|  | BaO | 0.2 | — | — | — |
|  | TiO2 | 4.0 | — | 0.5 | — |
|  | ZrO3 | 1.0 | — | — | — |
|  | ZnO | — | — | 9.1 | — |
|  | B2O3 | — | — | 1.0 | — |
|  | As2O3 | — | — | 0.07 | — |
|  | Sb2O3 | — | — | 0.07 | — |
|  | F | — | — | — | 19.0 |
| Thickness of Compressive Stress Layer (μm) | | 75 | 270 | 85 | — |
| Physical Properties | Young's Modulus (GPa) | 74 | 78 | 76 | 93 |

TABLE 6-continued

|  | Comparative Example | | | |
|---|---|---|---|---|
|  | 1 | 2 | 3 | 4 |
| Specific Gravity (g/cm³) | 2.56 | 2.43 | 2.41 | 2.60 |
| Specific Modulus (× 10⁶ Nm/kg) | 29.1 | 31.9 | 31.3 | 35.0 |
| Liquidus Temperature (° C.) | — | 960 | — | — |
| Thermal Expansion Coefficient (ppm/° C.) | — | — | 9.6 | — |
| Glass Transition Point (Tg: ° C.) | 626 | — | 555 | — |
| Surface Roughness (Ra: Å) | — | — | — | 25 | similar to Examples 1 through 30 to obtain a desired glass substrate.

The thickness of the compressive stress layer, the Young's modulus, the specific gravity, the specific modulus, the thermal expansion coefficient, and the glass transition point of the glass substrate were similarly obtained and shown in Table 6.

Comparative Example 4

Glass materials were weighted so as to obtain a comparative glass sample having a substantially same composition (in terms of mol %) described in Japanese Unexamined Patent Publication (JP-A) No. 187711/95. The glass materials were mixed, melted and then subjected to heat treatment at the temperature and for a period specified in the publication to obtain crystallized glass. Thereafter, the crystallized glass was processed in the manner similar to Examples 1 through 30 to obtain a desired glass substrate.

The Young's modulus, the specific gravity, the specific modulus, and the surface roughness of the glass substrate were similarly obtained and shown in Table 6.

As seen from Tables 1 through 5, each of the glass substrates obtained in Examples 1 through 30 has a high Young's modulus between 102 and 120 GPa and an excellent surface roughness (max) between 3 and 5 angstroms. The liquidus temperature of the glass substance for each of these glass substrates is relatively low, specifically, between 1000 and 1230° C. Therefore, in a magnetic disk using each of these glass substrates, it is possible to stably keep a flying height of 1 μm or less even during the high speed rotation.

On the other hand, each of the glass substrates in Comparative Examples 1 through 3 has a low Young's modulus between 74 and 78 GPa. The crystallized glass substrate obtained in Comparative Example 4 has a surface roughness (Rmax) as inferior as 25 angstroms. Therefore, it is supposed that the magnetic disk using each of these glass substrate and the crystallized glass substrate is difficult to stably keep a flying height of 1 μm. or less during the high speed rotations.

As shown in Tables 1 through 5, it has been found out that Examples 1 through 30 belong to a range specified by 35–65 mol % of $SiO_2$, 0–15 mol % of $Al_2O_3$, 3–30 mol % of ($Li_2O+Na_2O$), 1–45 mol % of CaO, 5–45 mol % of (MgO+ CaO), and 0.1–30 mol % of $TiO_2$. Especially, an amount of (MgO+CaO) may be preferably restricted to a range between 5 and 35 mol %. More preferably, it has been confirmed by the experiments that an amount of $SiO_2$ falls within a range which exceeds 55 mol % and which is not greater than 65 mol % examples 31. through 36.

EXAMPLES 31 THROUGH 36

Each magnetic disk was prepared from the glass substrates obtained in each of Examples 25 through 30 in the following manner.

At first, a laser beam was used to for a texture on a landing zone of the glass substrate so as to prevent attraction between the magnetic MR head and the magnetic disk. Subsequently, a Cr underlying layer, a CoPtCrTa magnetic layer, and a carbon protection layer were successively formed on a surface of the substrate which is provided with the texture to obtain the magnetic disk.

Each magnetic disk thus prepared was mounted on a hard disk unit and rotated at 12000 rpm with the flying height kept at 1 μm or less to be subjected to a recording/ reproducing test. As a result, in all magnetic disks, normal recording/reproducing operations could be effectively carried out.

Next, description will be directed to the second embodiment of this invention based on the seventh through the ninth subsidiary aspects mentioned above.

The glass substrate, namely, the information recording substrate according to the seventh aspect of this invention is specified by coexistence of $Y_2O_3$ and $TiO_2$ to accomplish the Young's modulus and the liquidus temperature mentioned above and may be referred to as a glass substrate I of the second embodiment. More specifically, the glass substrate I of the second embodiment includes $Y_2O_3$ and $TiO_2$ in addition to $SiO_2$, $Al_2O_3$, MgO and/or CaO, and $Li_2O$.

In addition, the glass substrate, namely, the information recording substrate according to the eighth aspect of this invention includes coexistence of $Y_2O_3$, $TiO_2$, and $ZrO_2$ in addition to a glass composition of $SiO_2$ $Al_2O_3$, MgO and/or CaO, and $Li_2O$ and may be called a glass substrate II of the second embodiment.

Moreover, the glass substrate, namely, the information recording substrate according to the ninth aspect of this invention includes coexistence of $TiO_2$ and at least one rare earth metal oxide which is selected from a group consisting of $Er_2O_3$, $Nd_2O_3$, $Sm_2O_3$, $Eu_2O_3$, $Gd_2O_3$, $T_2O_3$, $Dy_2O_3$, and $Yb_2O_3$ and may be called a glass substrate III of the second embodiment. The rare earth metal oxide also serves to increase the Young's modulus like the transition metal oxide but is liable to increase the specific gravity. Taking this into consideration, such rare earth metal oxide is effective when its amount falls within a range between 0 and 10 mol %. Such the rare earth metal oxide may substitute for $Y2O_3$. Furthermore, it has been found out that the desired Young's modulus and the desired liquidus temperature can be accomplished by coexistence of only $TiO_2$ and $ZrO_2$ included together with $SiO_2$, $Al_2O_3$, $Li_2O$, $Na_2O$, CaO, and MgO to for a glass substrate IV of the second embodiment.

In Table 7, Examples 1 through 48 are enumerated which are classified into the glass substrates I, II, and III. As shown in Table 7, Examples 1, 2, 3, 4, 5, 9, 10, 11, 12, 13, 14, 15, 16, 17, 18, 19, 21, 22, 24, 25, 29, 36, 37, and 38 which include coexistence of $Y_2O_3$, $TiO_2$, and $ZrO_2$ form the glass substrate II of the second embodiment while Examples 6, 7, 8, 20, 23, 26, 27, 28, 30, 31, 32, 33, 34, 35, 39, and 40 which include coexistence of $Y_2O_3$ and $TiO_2$ without any $ZrO_2$ form the glass substrate I of the second embodiment. In addition, Examples 41 through 48

TABLE 7-1

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| SiO2 | 55.0 | 55.0 | 55.0 | 55.0 | 54.0 | 55.0 | 55.0 | 53.0 | 53.0 | 52.0 | 52.0 | 52.0 | 52.0 | 52.0 |
| Al2O3 | 7.0 | 7.0 | 7.0 | 9.0 | 5.0 | 6.0 | 7.0 | 6.0 | 6.0 | 5.0 | 5.0 | 5.0 | 7.0 | 6.5 |
| MgO | 10.0 | 14.0 | 18.0 | 13.0 | 20.0 | 20.0 | 18.0 | 16.0 | 16.0 | 12.0 | 14.0 | 12.0 | 10.0 | 8.0 |
| CaO | 8.0 | 4.0 |  |  |  |  |  | 4.0 |  | 8.0 | 8.0 | 8.0 | 8.0 | 12.0 |
| SrO |  |  |  |  |  |  |  |  |  |  |  |  |  |  |
| BaO |  |  |  |  |  |  |  |  |  |  |  |  |  |  |
| ZnO |  |  |  |  |  |  |  |  | 4.0 |  |  |  |  |  |
| Li2O | 10.0 | 10.0 | 10.0 | 13.0 | 10.0 | 10.0 | 10.0 | 10.0 | 10.0 | 10.0 | 8.0 | 10.0 | 10.0 | 10.0 |
| Na2O |  |  |  |  |  |  |  |  |  |  |  |  |  |  |
| Y2O3 | 2.0 | 2.0 | 2.0 | 2.0 | 2.0 | 2.0 | 3.0 | 2.0 | 3.0 | 3.0 | 3.0 | 2.0 | 3.0 |  |
| TiO2 | 5.5 | 5.5 | 5.5 | 5.0 | 7.0 | 7.0 | 7.0 | 6.0 | 6.0 | 8.0 | 8.0 | 7.0 | 6.0 | 7.0 |
| ZrO2 | 2.5 | 2.5 | 2.5 | 3.0 | 2.0 |  |  |  | 2.0 | 2.0 | 2.0 | 2.0 | 2.0 | 2.0 |
| CeO2 |  |  |  |  |  |  |  |  |  |  |  | 2.0 | 2.0 |  |
| Liquidus Temperature (° C.) | 1232 | 1242 | 1247 | 1210 | 1243 | 1238 | 1204 | 1228 | 1244 | 1237 | 1231 | 1211 | 1220 | 1227 |
| Young13 s Modulus (GPa) | 106.5 | 106.7 | 106.3 | 104.0 | 108.7 | 105.6 | 106.1 | 111.0 | 109.7 | 112.1 | 112.6 | 111.2 | 111.9 | 109.7 |
| Glass Transition Point (Tg: ° C.) | 608 | 615 | 626 | 581 | 616 | 612 | 618 | 615 | 609 | 609 | 626 | 601 | 612 | 608 |
| Surface Roughness (Ra: Å) | 3 | 3 | 3 | 3 | 3 | 3 | 3 | 3 | 3 | 3 | 3 | 3 | 3 | 3 |

TABLE 7-2

|  | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| SiO2 | 50.0 | 50.0 | 52.0 | 52.0 | 52.0 | 52.0 | 50.0 | 52.0 | 52.0 | 52.0 | 52.0 | 52.0 | 52.0 | 52.0 |
| Al2O3 | 8.0 | 8.0 | 5.5 | 5.5 | 5.0 | 6.0 | 6.5 | 5.3 | 5.5 | 5.5 | 5.5 | 6.0 | 6.0 | 5.0 |
| MgO | 8.0 | 8.0 | 7.0 | 10.5 | 10.0 | 11.0 | 10.0 | 7.0 | 7.0 | 4.0 | 7.0 | 7.5 | 7.0 | 5.0 |
| CaO | 12.0 | 14.0 | 14.0 | 10.5 | 10.0 | 11.0 | 10.0 | 12.0 | 15.0 | 17.0 | 12.0 | 12.0 | 10.0 | 10.0 |
| SrO |  |  |  |  |  |  |  | 2.0 |  |  |  |  |  | 8.0 |
| BaO |  |  |  |  |  |  | 2.0 |  |  |  |  |  |  |  |
| ZnO |  |  |  |  |  |  |  |  |  |  |  |  | 5.0 |  |
| Li2O | 8.0 | 10.0 | 10.0 | 10.0 | 12.0 | 10.0 | 10.0 | 10.0 | 10.0 | 10.0 | 12.0 | 12.0 | 10.0 | 10.0 |
| Na2O | 2.5 |  |  |  |  |  |  |  |  |  |  |  |  |  |
| Y2O3 | 2.5 | 2.0 | 2.5 | 2.1 | 2.5 | 3.0 | 2.5 | 2.7 | 3.5 | 2.5 | 2.5 | 3.5 | 3.0 | 3.0 |
| TiO2 | 7.0 | 6.0 | 7.0 | 7.0 | 6.5 | 7.0 | 7.0 | 7.0 | 7.0 | 7.0 | 7.0 | 7.0 | 7.0 | 7.0 |
| ZrO2 | 2.0 | 2.0 | 2.0 | 2.0 | 2.0 |  | 2.0 | 2.0 |  | 2.0 | 2.0 |  |  |  |
| CeO2 |  |  |  |  |  |  |  |  |  |  |  |  |  |  |
| Liquidus Temperature (° C.) | 1241 | 1211 | 1188 | 1212 | 1190 | 1153 | 1226 | 1187 | 1144 | 1158 | 1187 | 1172 | 1158 | 1094 |
| Young's Modulus (GPa) | 108.3 | 109.8 | 110.2 | 111.0 | 111.1 | 110.0 | 110.3 | 110.1 | 110.3 | 109.4 | 109.9 | 109.7 | 108.8 | 107.7 |
| Glass Transition Point (Tg: ° C.) | 600 | 607 | 607 | 606 | 590 | 598 | 606 | 605 | 603 | 608 | 592 | 588 | 587 | 593 |
| Surface Roughness (Ra: Å) | 3 | 3 | 3 | 3 | 3 | 3 | 3 | 3 | 3 | 3 | 3 | 3 | 3 | 3 |

TABLE 7-3

|  | 29 | 30 | 31 | 32 | 33 | 34 | 35 | 36 | 37 | 38 | 39 | 40 | 41 |
|---|---|---|---|---|---|---|---|---|---|---|---|---|---|
| SiO2 | 52.0 | 58.0 | 52.0 | 52.0 | 52.0 | 60.0 | 52.0 | 52.0 | 52.0 | 52.0 | 52.0 | 52.0 | 52.0 |
| Al2O3 | 5.5 | 6.0 | 5.0 | 5.0 | 5.0 | 4.0 | 5.0 | 5.5 | 5.5 | 5.5 | 5.5 | 5.0 | 5.0 |
| MgO |  | 6.0 | 10.0 | 8.5 | 8.5 | 4.5 | 7.0 | 4.0 | 4.0 | 4.0 | 10.0 | 8.5 | 10.5 |
| CaO | 21.0 | 8.0 | 10.0 | 9.0 | 9.0 | 4.5 | 7.5 |  |  |  | 10.0 | 9.0 | 10.5 |
| SrO |  |  |  |  |  |  |  | 6.0 | 17.0 |  |  |  |  |
| BaO |  |  |  |  |  |  |  |  |  | 17.0 |  |  |  |
| ZnO |  |  |  |  |  |  |  |  |  | 17.0 |  |  |  |
| Li2O | 10.0 | 12.0 | 12.5 | 12.5 | 15.0 | 12.0 | 12.5 | 10.0 | 10.0 | 10.0 | 7.5 | 7.5 | 11.0 |
| Na2O |  |  |  |  |  |  |  |  |  |  | 5.0 | 7.5 |  |
| Y2O3 | 2.5 | 2.0 | 3.0 | 3.0 | 3.0 | 8.0 | 3.0 | 2.5 | 2.5 | 2.5 | 3.0 | 3.0 |  |
| TiO2 | 7.5 | 8.0 | 7.5 | 10.0 | 7.5 | 7.0 | 7.0 | 7.0 | 7.0 | 7.0 | 7.0 | 7.0 | 7.0 |
| ZrO2 | 2.0 |  |  |  |  |  |  | 2.0 | 2.0 | 2.0 |  |  |  |
| Er2O3 |  |  |  |  |  |  |  |  |  |  |  |  | 5.0 |
| Liquidus Temperature (° C.) | 1126 | 1056 | 1103 | 1174 | 1096 | 1143 | 1065 | 1084 | 1032 | 1075 | 1091 | 1043 | 1101 |
| Young's Modulus (GPa) | 109.1 | 103.5 | 110.5 | 110.3 | 106.6 | 106.7 | 108.2 | 106.2 | 103.3 | 105.1 | 105.2 | 102.1 | 110.4 |
| Glass Transition Point (Tg: ° C.) | 602 | 565 | 580 | 582 | 560 | 623 | 576 | 572 | 569 | 565 | 569 | 542 | 603 |
| Surface Roughness (Ra: Å) | 3 | 3 | 3 | 3 | 3 | 3 | 3 | 3 | 3 | 3 | 3 | 3 | 3 |

TABLE 7-4

|  | 42 | 43 | 44 | 45 | 46 | 47 | 48 |
|---|---|---|---|---|---|---|---|
| SiO2 | 52.0 | 52.0 | 52.0 | 52.0 | 52.0 | 52.0 | 52.0 |
| Al2O3 | 5.0 | 5.0 | 5.0 | 5.0 | 5.0 | 5.0 | 5.0 |
| MgO | 10.5 | 10.5 | 10.5 | 10.5 | 10.5 | 10.5 | 10.5 |
| CaO | 10.5 | 10.5 | 10.5 | 10.5 | 10.5 | 10.5 | 10.5 |
| Li2O | 10.0 | 10.0 | 10.0 | 10.0 | 10.0 | 10.0 | 10.0 |
| Nd2O3 | 5.0 |  |  |  |  |  |  |
| Sm2O3 |  | 5.0 |  |  |  |  |  |
| Eu2O3 |  |  | 5.0 |  |  |  |  |
| Gd2O3 |  |  |  | 5.0 |  |  |  |
| Tb2O3 |  |  |  |  | 5.0 |  |  |
| Dy2O3 |  |  |  |  |  | 5.0 |  |
| Yb2O3 |  |  |  |  |  |  | 5.0 |
| TiO2 | 7.0 | 7.0 | 7.0 | 7.0 | 7.0 | 7.0 | 7.0 |
| Liquidus Temperature (° C.) | 1124 | 1121 | 1132 | 1119 | 1234 | 1211 | 1195 |

TABLE 7-4-continued

|  | 42 | 43 | 44 | 45 | 46 | 47 | 48 |
|---|---|---|---|---|---|---|---|
| Young's Modulus (GPa) | 106.0 | 106.9 | 107.3 | 107.8 | 109.1 | 108.5 | 109.9 |
| Glass Transition Point (Tg: °C.) | 611 | 608 | 610 | 606 | 605 | 610 | 612 |
| Surface Roughness (Ra: Å) | 3 | 3 | 3 | 3 | 3 | 3 | 3 | which include coexistence of $TiO_2$ and at least one rare earth metal oxide form the glass substrate III of the second embodiment.

In addition, Examples 49 to 61 shown in Table 8 exemplify the glass substrates I, II, III, and IV of the second embodiment. Namely, Examples 49, 52, 53, 55, and 59 which include coexistence of $TiO_2$ and $Y_2O_3$ may be referred to as the glass substrate I of the second embodiment while Examples 50, 54, 55, 56, 57, 59 which include coexistence of $TiO_2$, $Y_2O_3$, and $ZrO_2$ might be referred to as the glass substrate II of the second embodiment. Further, Examples 61 and 62 which include both $TiO_2$ and $ZrO_2$ alone may be called the glass substrate IV of the second embodiment.

As regards Table 8, it is to be noted that a thickness of a compressive stress layer, viscosity, a thermal expansion coefficient, specific gravity, and specific modulus are shown as factors of measurement together with liquidus temperature, Young's modulus, transition point (Tg), and surface roughness.

As shown in Tables 7 and 8, Examples 1 through 61 of the second embodiment comprises 45–65 mol % of $SiO_2$, 0–15 mol % of $Al_2O_3$, 4–20 mol % of $Li_2O$, 0–8 mol % of $Na_2O$, 3–30 mol % of ($Li_2O+Na_2O$), 0–21 mol % of CaO, 0–22 mol % of MgO, 4–40 mol % of (CaO+MgO), 0–16 mol % Of $Y_2O_3$, 1–15 mol % of $TiO_2$, and 0–10 mol % of $ZrO_2$. Examples 41 to 48 which are free from $Y_2O_3$ comprise the rare earth metal oxide of 5 mol % selected from the group consisting of $Er_2O_3$, $Nd_2O_3$, $Sm_2O_3$, $Eu_2O_3$, $Gd_2O_3$, $Tb_2O_3$, $Dy_2O_3$, and $Yb_2O_3$. Each amount

TABLE 8-1

|  |  | Example | | | | | | |
|---|---|---|---|---|---|---|---|---|
|  |  | 49 | 50 | 51 | 52 | 53 | 54 | 55 |
| Glass Composition (mol %) | SiO2 | 52 | 58 | 55 | 45 | 55 | 45 | 40 |
|  | Al2O3 | 6 | 3 | 7 | 10 | 9 | 4 | 3 |
|  | Li2O | 10 | 12 | 10 | 9 | 19 | 20 | 7 |
|  | Na2O | — | 4 | — | — | — | 8 | — |
|  | Li2O + Na2O | 10 | 16 | 10 | 9 | 19 | 28 | 7 |
|  | CaO | 11 | 6 | 4 | 5 | 5 | 1 | 18 |
|  | MgO | 11 | 6 | 14 | 15 | 3 | 4 | 22 |
|  | CaO + MgO | 22 | 12 | 18 | 20 | 8 | 5 | 40 |
|  | TiO2 | 7 | 8 | 5.5 | 15 | 3 | 12 | 4 |
|  | Y2O3 | 3 | 0.5 | 2 | 1 | 6 | 1 | 5 |
|  | ZrO2 | — | 2.5 | 2.5 | — | — | 5 | 1 |
|  | Other Components |  |  |  |  |  |  |  |
| Thickness of Compressive Stress Layer (μm) |  | 50 | 80 | 75 | 30 | 85 | 90 | 40 |
| Physical Properties | Young's Modulus (GPa) | 110 | 102 | 107 | 107 | 104 | 106 | 115 |
|  | Specific Gravity (g/cm³) | 2.87 | 2.73 | 2.79 | 2.82 | 2.71 | 2.83 | 3.12 |
|  | Specific Modulus (×10⁶ Nm/kg) | 38 | 37 | 38 | 38 | 38 | 37 | 37 |
|  | Liquidus Temperature (° C.) | 1153 | 1100 | 1240 | 1110 | 1020 | 990 | 1210 |
|  | Viscosity (poise) at 1200° C. | 50 | 40 | — | 30 | 50 | 10 | 20 |
|  | at 1100° C. | — | — | — | — | 110 | 30 | 40 |
|  | at 1250° C. | — | — | 20 | — | — | — | — |
|  | Thermal Expansion Coefficient (ppm/° C.) | 7.9 | 8.0 | 6.9 | 7.0 | 8.6 | 11.5 | 8.9 |
|  | Glass Transition Point (Tg: ° C.) | 569 | 554 | 615 | 620 | 465 | 400 | 570 |
|  | Surface Roughness (Ra: Å) | 4 | 3 | 3 | 4 | 5 | 4 | 6 |

TABLE 8-2

|  |  | Example | | | | | |
|---|---|---|---|---|---|---|---|
|  |  | 56 | 57 | 58 | 59 | 60 | 61 |
| Glass Composition (mol %) | SiO2 | 65 | 60 | 45 | 58 | 45 | 45 |
|  | Al2O3 | 5 | 2 | 2 | 4 | 2 | 2 |
|  | Li2O | 4 | 16 | 10 | 5 | 12 | 11 |
|  | Na2O | — | 5 | 7 | 1 | 3 | 2 |

TABLE 8-2-continued

|  |  | Example | | | | | |
|---|---|---|---|---|---|---|---|
|  |  | 56 | 57 | 58 | 59 | 60 | 61 |
|  | Li2O + Na2O | 4 | 21 | 17 | 6 | 15 | 13 |
|  | CaO | 7 | 4 | 15 | 3 | 12 | 10.5 |
|  | MgO | 7 | 4 | 10 | 16 | 12 | 10.5 |
|  | CaO + MgO | 14 | 8 | 25 | 19 | 24 | 21 |
|  | TiO2 | 1 | 5 | 10 | 8 | 12 | 9 |
|  | Y2O3 | 6 | 3 | 1 | 0.8 | — | — |
|  | ZrO2 | 5 | 1 | — | 4.2 | 2 | 10 |
|  | Other Components |  |  |  |  |  |  |
| Thickness of Compressive Stress Layer ($\mu$m) |  | 20 | 80 | 40 | 35 | 70 | 45 |
| Physical Properties | Young's Modulus (GPa) | 101 | 100 | 108 | 103 | 112 | 119 |
|  | Specific Gravity (g/cm$^3$) | 2.88 | 2.67 | 2.83 | 2.79 | 2.85 | 3.05 |
|  | Specific Modulus ($\times 10^6$ Nm/kg) | 35 | 37 | 38 | 37 | 39 | 39 |
|  | Liquidus Temperature (° C.) | 1110 | 990 | 1120 | 1090 | 1130 | 1210 |
|  | Viscosity at 1200° C. | 100 | 30 | 20 | 40 | 20 | — |
|  | (poise) at 1100° C. | — | 70 | — | 80 | — | — |
|  | at 1250° C. | — | — | — | — | — | 10 |
|  | Thermal Expansion Coefficient (ppm/° C.) | 7.2 | 9.6 | 9.6 | 7.8 | 9.3 | 9.2 |
|  | Glass Transition Point (Tg: ° C.) | 620 | 455 | 565 | 610 | 565 | 525 |
|  | Surface Roughness (Ra: Å) | 5 | 5 | 3 | 3 | 4 | 4 |

TABLE 9

| Example | 2 | 4 | 29 | 9 | 13 | 17 | 49 | 50 |
|---|---|---|---|---|---|---|---|---|
| SiO2 | 42 | 35 | 37 | 60 | 54 | 46 | 52 | 58 |
| Al2O3 | 2 | 8 | 2 | 0 | 0 | 0 | 6 | 3 |
| Li2O | 5 | 4 | 4 | 6 | 12 | 4 | 10 | 12 |
| Na2O | 5 | 6 | 2 | 3 | 8 | 5 |  | 4 |
| CaO | 13 | 18 | 19 | 9 | 2 | 15 | 11 | 6 |
| MgO | 10 | 12 | 24 | 9 | 8 | 15 | 11 | 6 |
| TiO2 | 23 | 15 | 14 | 11 | 16 | 15 | 7 | 8 |
| Fe2O3 |  | 2 |  |  |  |  |  |  |
| ZrO2 |  |  |  | 2 |  |  |  | 2.5 |
| Nb2O3 |  |  |  |  |  | 2 |  |  |
| La2O3 |  |  |  |  |  | 2 |  |  |
| Y2O3 |  |  |  |  |  |  | 3 | 0.5 |
| Extracted Alkali Ion ($\mu$mol/disk) | 43.3 | 75 | 82 | 5.1 | 9.5 | 18 | 6 | 2.7 |
| Extracted Alkali Ion ($\mu$mol/cm$^2$) | 0.72 | 1.25 | 1.37 | 0.09 | 0.16 | 0.3 | 0.1 | 0.045 | or content of the above-mentioned components is determined by reasons which have been already mentioned in connection with the first embodiment above.

Furthermore, the glass substrates according to the first and the second embodiments were immersed in water to test an amount of dissolution of alkali ions into the water. In Table 9, the amount of dissolution has been shown at each disk of 2.5 inches and at unit area (cm$^2$) in connection with Examples 2, 4, 29, 9, 3, and 17 of the first embodiment and with Examples 49 and 50 of the second embodiment. As shown in Table 9, each amount of dissolution of Examples 9, 13, and 17 is smaller than that of Examples 2, 4, and 29. This is also true of Examples 49 and 50. this shows that the amount of dissolution tends to be decreased with an increase of the amount of SiO$_2$. This means that water durability is improved as the amount of SiO$_2$ is increased within 65 mol %.

It should be noted that each of Examples 1 through 61 of the second embodiment have the Young's modulus greater than 100 GPa and the liquidus temperature not higher than 1350° C.

In addition, Examples 16, 17, 20, 23, and 31 of the second embodiment were chemically strengthened within a predetermined processing bath at a prescribed ion exchange temperature. In Table 10, the Young's modulus, the transition point or temperature (Tg), bending strength, and a surface roughness were measured in each example. The results of the measurement are tabulated in Table 10.

TABLE 10

| Embodiment | 16 | 17 | 20 | 23 | 31 |
|---|---|---|---|---|---|
| SiO2 | 51.0 | 52.0 | 52.0 | 52.0 | 52.0 |
| Al2O3 | 8.0 | 5.5 | 6.0 | 5.5 | 5.0 |
| MgO | 8.0 | 7.0 | 11.0 | 7.0 | 10.0 |
| CaO | 14.0 | 14.0 | 11.0 | 15.0 | 10.0 |
| Li2O | 10.0 | 10.0 | 10.0 | 10.0 | 12.5 |
| Y2O3 | 2.0 | 2.5 | 3.0 | 3.5 | 3.0 |
| TiO2 | 6.0 | 7.0 | 7.0 | 7.0 | 7.5 |

TABLE 10-continued

| Embodiment | 16 | 17 | 20 | 23 | 31 |
|---|---|---|---|---|---|
| ZrO2 | 2.0 | 2.0 | | | |
| Transition Point (Tg: ° C.) | 607 | 607 | 598 | 603 | 580 |
| Young's Modulus (GPa) | 109.8 | 110.2 | 110.0 | 110.3 | 110.5 |
| Surface Roughness (Ra: Å) | 3 | 3 | 3 | 3 | 3 |
| Bending Strength (kg/mm²) | 75 | 72 | 81 | 79 | 86 |
| Molten Salt Bath | 60% KNO3 + 40% NaNO3 | 60% KNO3 + 40% NaNO3 | KNO3 | NaNO3 | 60% KNO3 + 40% NaNO3 |
| Ion Exchange Temperature (° C.) | 500 | 500 | 490 | 500 | 480 |
| Processing Time (h) | 4.0 | 4.0 | 4.0 | 4.0 | 4.0 |

As described above, with the substrate (glass substrate) of this invention, it is possible to obtain the information recording medium substrate which can readily meet the increase in rotation speed. Thus, the recording/reproducing apparatus having a high recording capacity and a high access speed can be obtained by the use of the information recording medium comprising the substrate according to this invention.

Finally referring to FIG. 1, illustration is made about a correlation between a Young's modulus and a relative value of vibration of disks each of which is rotated at a speed of 10,000 rpm and which has a diameter of 3.5 Inches. To this end, provision has been made as regards two kinds of the disks which are classified into conventional disks and disks according to this invention. The disks according to this invention have the information recording substrates represented by Examples 8, 10, 15, 24, and 30 which are tabulated in Tables 2–5 and which are depicted at E-8, E-10, E-15, E-24, and E-30, respectively. On the other hand, the conventional disks have an aluminum substrate, a fused SiO, substrate, the comparative Example 1 (Table 6), and the comparative Example 2 (Table 6) which are depicted at A, B, C, and It, respectively.

In FIGURE, a relative value of disk vibration is shown in relation to the aluminum substrate. In other words, the vibration of the aluminum substrate is represented as 100 while the vibrations of the remaining substrates are represented by relative vibration values. From this FIGURE, it is readily understood that the conventional disks A, B, C, and D are low in Young's modulus and are largely vibrated when they are rotated at a high speed, such as 10,000 rpm. On the other hand, the disks according to this invention which have the information recording substrate of very high Young's modules have vibrations less than 60% in comparison with the vibration of the aluminum substrate. Accordingly, the information recording substrate according to this invention has a high Young's modulus and can suppress the vibration when they form the disks His shows that a flying height of a magnetic head can be stabilized when the disks are manufactured by the use of the information recording substrates according to this invention.

What is claimed is:

1. An information recording substrate, comprising a glass substance having a Young's modulus not smaller than 100 GPa, and a liquidus temperature not higher than 1350° C.

2. An information recording substrate as claimed in claim 1, having specific gravity not greater than 3.5 g/cm³.

3. An information recording substrate as claimed in claim 1, wherein said glass substance in a formable temperature range has a viscosity not smaller than 10 poises.

4. An information recording substrate as claimed in claim 2, wherein said glass substance in a formable temperature range has a viscosity not smaller than 10 poises.

5. An information recording substrate as claimed in claim 1, further having a thermal expansion coefficient falling within a range between 7 and 14 ppm/°C.

6. An information recording substrate as claimed in claim 2, further having a thermal expansion coefficient falling within a range between 7 and 14 ppm/°C.

7. An information recording substrate as claimed in claim 3, further having a thermal expansion coefficient falling within a range between 7 and 14ppm/°C.

8. An information recording substrate as claimed in claim 4, further having a thermal expansion coefficient falling within a range between 7 and 14ppm/°C.

9. An information recording substrate, comprising a glass substance at least including $TiO_2$ and CaO as glass components;

the contents of the glass components being selected so that a Young's modulus is not smaller than 100 GPa and a liquidus temperature is not higher than 1350° C.

10. An information recording substrate, comprising a glass substance at least including $TiO_2$ and CaO as glass components;

the contents of the glass components being selected so that a Young's modulus is not smaller than 100 GPa, a liquidus temperature is not higher than 1350° C., and a viscosity is not smaller than 10 poises in a formable temperature range.

11. A information recording substrate, comprising a glass substance which includes, as glass components, $TiO_2$, CaO, MgO, and $Al_2O_3$ along with at least $Li_2O$ selected from a group consisting of $Na_2O$ and $Li_2O$;

the contents of the glass components being selected liquidus temperature is not higher than 1350° C., a viscosity in a formable temperature range is not smaller than 10 poises, and specific gravity is not greater than 3.5 g/cm³.

12. An information recording substrate as claimed in claim 11, further comprising both $Y_2O_3$ and $ZrO_2$.

13. An information recording substrate as claimed in claim 11, wherein the glass substance has a transition temperature not higher than 650° C.

14. An information recording substrate as claimed in claim 12, wherein the glass substance has a transition temperature not higher than 650° C.

15. An information recording substrate as claimed in claim 13, wherein the glass substance has the transition temperature not higher than 550° C.

16. An information recording substrate as claimed in claim 14, wherein the glass substance has the transition temperature not higher than 550° C.

17. An information recording substrate, comprising a glass substance including, as glass components, 0.1–30 mol % of $TiO_2$, 1–45 mol % of CaO, 5–40 mol % of (MgO+CaO), 3–30 mol % of ($Na_2O+Li_2O$), less than 15 mol % of $Al_2O_3$, and 35–65 mol % of $SiO_2$.

18. An information recording substrate formed by glass which comprises 0.1–30 mol % of $TiO_2$, 1–45 mol % of CaO, 5–40 mol % of (MgO+CaO), 3–30 mol % of ($N_2O+Li_2O$), less than 5 mol % of $Al_2O_3$, and 35–65 mol % of $SiO_2$.

19. An information recording substrate formed by glass which comprises 0.1–30 mol % of $TiO_2$, 1–45 mol % of CaO, 5–40 mol % of (MgO+CaO), 3–30 mol % of ($Na_2O+Li_2O$), less than 15 mol % of $Al_2O_3$, and more than 55 mol % and up to 65 mol % of $SiO_2$.

20. An information recording substrate formed by glass which comprises 5–15 mol % of $TiO_2$, 4–20 mol % of CaO, 5–30 mol % of (MgO+CaO), 5–22 mol % of ($Na_2O+Li_2O$), 0–8 mol % of $Al_2O_3$, and 40–60 mol % of $SiO_2$.

21. An information recording substrate as claimed in claim 17, which includes at least one oxide of transition metals except titanium oxide in place of a part or a whole of $TiO_2$.

22. An information recording substrate as claimed in claim 18, which includes at least one oxide of transition metals except titanium oxide in place of a part or a whole of $TiO_2$.

23. An information recording substrate as claimed in claim 19, which includes at least one oxide of transition metals except titanium oxide in place of a part or a whole of $TiO_2$.

24. An information recording substrate as claimed in claim 20, which includes at least one oxide of transition metals except titanium oxide in place of a part or a whole of $TiO_2$.

25. An information recording substrate as claimed in claim 21, wherein at least one oxide of the transition metals is formed by at least one metal oxide selected from a group consisting of oxides of Cr, Mn, Fe, Co, Ni, Ga, Ge, Y, Zr, Nb, A, La, Ce, Pr, Nd, Pm, Bu, Gd, Tb, Dy, Ho, Er, Tm, Yb, Hf, Ta, and W.

26. An information recording substrate as claimed in claim 21, wherein at least one oxide of the transition metals is formed by at least one metal oxide selected from a group consisting of oxides of Cr, E, Fe, Co, Ni, Ga, Ge, Y, Zr, Nb, Ho, La, Ce, Pr, Nd, Pm, Eu,,Gd, T, Dy, Ho, Er, Tm, Yb, Hf, Ta, and W.

27. An information recording substrate as claimed in claim 22, wherein at least one oxide of the transition metals is formed by at least one metal oxide selected from a group consisting of oxides of Cr, , Fe, Co, Ni, Ga, Ge, Y, Zr, Nb, MgO, La, Ce, Pr, Nd, Pm, Eu, Gd, Tb, Dy, No, Er, TMgO, Yb, Hf, Ta, and W.

28. An information recording substrate as claimed in claim 23, wherein at least one oxide of the transition metals is formed by at least one metal oxide selected from a group consisting of oxides of Cr, Mn, Fe, Co, Ni, Ga, Ge, Y, Zr, Nb, Mo, La, Ce, Pr, Nd, Pm, Fu, Gd, Tb, Dy, Ho, Er, Tm, Yb, Hf, Ta, and W.

29. An information recording substrate as claimed in claim 24, wherein at least one oxide of the transition metals is formed by at least one metal oxide selected from a group consisting of oxides of Cr, Mn, Fe, Co, Ni, Ga, Ge, Y, Zr, Nb, Mo, La, Ce, Pr, Nd, Pm, Eu, Gd, Tb, Dy, Ho, Er, Tm, Yb, Hf, Ta, and W.

30. An information recording substrate as claimed in claim 21, wherein the at least one oxide is formed by at least one metal oxide selected from a group consisting of oxides of Cu, V, and Zn.

31. An information recording substrate as claimed in claim 22, wherein the at least one oxide is formed by at least one metal oxide selected from a group consisting of oxides of Cu, V, and Zn.

32. An information recording substrate as claimed in claim 23, wherein the at least one oxide is formed by at least one metal oxide selected from a group consisting of oxides of Cu, V, and Zn.

33. An information recording substrate as claimed in claim 24, wherein the at least one oxide is formed by at least one metal oxide selected from a group consisting of oxides of Cu, V, and Zn.

34. An information recording substrate as claimed in claim 21, comprising 0.1–15 mol % of the at least one oxide of the transition metals together with $TiO_2$.

35. An information recording substrate as claimed in claim 22, comprising 0.1–15 mol % of the at least one oxide of the transition metals together with $TiO_2$.

36. An information recording substrate as claimed in claim 23, comprising 0.1–15 mol % of the at least one oxide of the transition metals together with $TiO_2$.

37. An information recording substrate as claimed in claim 24, comprising 0.1–15 mol % of the at least one oxide of the transition metals together with $TiO_2$.

38. An information recording substrate as claimed in claim 21, comprising 0.1–8 mol % of the at least one oxide of the transition metals.

39. An information recording substrate as claimed in claim 22, comprising 0.1–8 mol % of the at least one oxide of the transition metals.

40. An information recording substrate as claimed in claim 23, comprising 0.1–8 mol % of the at least one oxide of the transition metals.

41. An information recording substrate as claimed fi claim 24, comprising 0.1–8 mol % of the at least one oxide of the transition metals.

42. An information recording substrate, comprising a glass substance including, as glass components, 0.1–30 mol % of $TiO_2$, 1–45 mol % of CaO, 5–40 mol % of (MgO+CaO), 3–30 mol % of ($Na_2O+Li_2O$), less than 15 mol % of $Al_2O_3$, and 35–65 mol % of $SiO_2$, together with at least one oxide of transition metals selected from a group consisting Of $Y_2O_3$ and $ZrO_2$.

43. An information recording substrate as claimed in claim 42, comprising 0.1–25 mol % of $Li_2O$.

44. An information recording substrate as claimed in claim 42, comprising 1–25 mol % of $Na_2O$.

45. An information recording substrate as claimed in claim 42, wherein the glass substance has a transition temperature not higher than 650 ° C.

46. An information recording substrate as claimed in claim 42, manufactured by press-forming by the use of a mold.

47. An information recording substrate comprising a glass substance including, as glass components, 0.1–30 mol % of $TiO_2$, 1–45 mol % of CaO, 5–40 mol % of (MgO+CaO), 3–30 mol % of ($Na_2O+Li_2O$), less than 15 mol % of $Al_2O_3$, and 35–65 mol % of $SiO_2$;

said glass substance including at least 40 mol % of ($SiO_2+Al_2O_3$), not less than 3 mol % of $Li_2O$, at least 5 mol % of ($Na_2O+Li_2O$), and up to 35 mol % of (CaO+MgO).

48. An information recording substrate as claimed in claim 17, chemically strengthened.

49. An information recording substrate as claimed in claims 17, formed by the glass substance which has a thermal expansion coefficient approximate to that of a material of a clamp fixed to an information recording medium manufactured from the information recording substrate.

50. An information recording medium comprising the information recording substrate claimed in claim 17 and a recording layer deposited on the information recording substrate.

51. An information recording substrate formed by a glass stance which comprises coexistence of $Y_2O_3$ and $TiO_2$ to accomplish a Young's modulus not smaller than 100 GPa and a liquidus temperature not higher than 1350° C.

52. An information recording substrate as claimed in claim 51, wherein the glass substance further comprises $SiO_2$, $Al_2O_3$, at least one of MgO and CaO, and $Li_2O$.

53. An information recording substrate as claimed in claim 52, comprising 45–65 mol % of $SiO_2$, 0–15 mol % of $Al_2O_3$, 4–20 mol % of $Li_2O$, 0–8 mol % of $Na_2O$, 3–30 mol % of ($Li_2O+Na_2O$), 0–21 mol % of CaO, 0–22 mol % of MgO, 4–40 mol % of (CaO+MgO), 0–16 mol % of $Y_2O_3$, 1–15 mol % of $TiO_2$.

54. An information recording substrate formed by a glass substance which comprises coexistence of $Y_2O_3$, $TiO_2$, and $ZrO_2$ to accomplish a Young's modulus not smaller than 100 GPa and a liquidus temperature not higher than 1350° C.

55. An information recording substrate, as claimed in claim 54, wherein the glass substance further comprises $SiO_2$, $Al_2O_3$, at least one of MgO and CaO, and $Li_2O$.

56. An information recording substrate ford by a glass substance which comprises coexistence of $TiO_2$ and at least one rare earth metal oxide which is selected from a group consisting of $Er_2O_3$, $Nd_2O_3$, $Sm_2O_3$, $Eu_2O_3$, $Gd_2O_3$, $Tb_2O_3$, $Dy_2O_3$, and $Yb_2O_3$.

57. An information recording substrate as claimed in claim 56, wherein the at least one rare earth metal oxide comprises up to 10 mol %.

58. An information recording substrate as claimed in claim 57, wherein the glass substance further comprises $SiO_2$, $Al_2O_3$, at least one of M and CaO, and $Li_2O$.

59. An information recording device for use in recording/reproducing information by a magnetic head in cooperation with an information recording medium manufactured from the information recording substrate claimed in claim 17.

* * * * *

UNITED STATES PATENT AND TRADEMARK OFFICE
CERTIFICATE OF CORRECTION

PATENT NO. : 5,997,977
DATED : December 7, 1999
INVENTOR(S) : Kazuaki Hashimoto et al.

It is certified that error appears in the above-identified patent and that said Letters Patent is hereby corrected as shown below:

Column 3,
Line 43, delete "leased" insert -- least --.

Column 6,
Line 50, delete "sow" insert -- same --;
Line 61, delete "TV" insert -- IV --.

Column 9,
Line 46, delete "A", insert -- Mn --;
Line 47, delete "Zx" insert -- Zr --;
Line 52, delete "young" insert -- Young's --.

Coumn 10,
Line 39, delete "teat" insert -- that --.

Column 12,
Line 23, "sale" insert -- sample --;
Line 34, delete "1-20" insert -- 1-30 --;
Line 40, delete "ode" insert -- oxide --.

Column 14,
Line 12, delete "sale" insert -- sample --.

Column 15,
Table 3, Example 15, line 8 delete "25" insert -- 26 --.

Column 17,
Table 4, column 2, delete "N20" insert -- Na20 --.

Column 19,
Line 44, delete "comically" insert -- chemically --.

Column 20,
Line 56, delete "(max)" insert -- (Rmax) --.

UNITED STATES PATENT AND TRADEMARK OFFICE
CERTIFICATE OF CORRECTION

PATENT NO.     : 5,997,977
DATED          : December 7, 1999
INVENTOR(S)    : Kazuaki Hashimoto et al.

It is certified that error appears in the above-identified patent and that said Letters Patent is hereby corrected as shown below:

Column 22,
Line 16, delete "$T_2$" insert -- $Tb_2$ --.
Table 7-1, column 1, line 17, delete "young 135" insert -- Young's --;
Table 7-1, column 13, line 17, delete "111.9" insert -- 110.9 --;
Table 7-1, column 14, line 10, below "10.0" insert -- 2.5 --.

Column 23,
Table 7-2, column 18, line 10, delete "2.1" insert -- 2.5 --;
Table 7-3, column 41, line 8, delete "11.0" insert -- 10.0 --.

Column 25,
Table 7-4, column 46, line 5, delete "109.1", insert -- 108.1 --.

Column 28,
Table 10, Embodiment 16 delete "51.0" insert -- 50.0 --.

Column 29,
Line 40, delete "It" insert -- D --;
Line 41, insert -- the -- before "FIGURE";
Line 55, "His" insert -- . This --.

Column 30,
Line 52, after "selected" insert -- so that a Young's modulus is not smaller than 100 Cpa, a --.

Column 31,
Line 42, delete "A" insert -- Mo --;
Line 42, delete "Bu", insert -- Eu --;
Line 47, delete "E" insert -- Mn --;
Line 48, delete "Ho" insert -- Mo --;
Line 48, delete ",,", insert -- , --;
Line 48, delete "T" insert -- Tb --;
Line 53, after "Cr," insert -- Mn --;
Line 54, delete "MgO" insert -- Mo --;
Line 54, delete "TmgO" insert -- Tm --;
Line 60, delete "Fu" insert -- Eu --.

UNITED STATES PATENT AND TRADEMARK OFFICE
CERTIFICATE OF CORRECTION

PATENT NO.   : 5,997,977
DATED        : December 7, 1999
INVENTOR(S)  : Kazuaki Hashimoto et al.

It is certified that error appears in the above-identified patent and that said Letters Patent is hereby corrected as shown below:

Column 32,
Line 37, delete "fi" insert -- in --.

Column 33,
Line 2, delete "claims" insert -- claim --;
Line 12, delete "stance" insert -- substances --.

Signed and Sealed this

Twenty-sixth Day of February, 2002

Attest:

JAMES E. ROGAN
Attesting Officer   Director of the United States Patent and Trademark Office